(12) United States Patent
Fujiwara

(10) Patent No.: US 10,021,361 B2
(45) Date of Patent: Jul. 10, 2018

(54) IMAGE PROCESSING DEVICE, IMAGING DEVICE, IMAGE PROCESSING METHOD, AND PROGRAM

(71) Applicant: FUJIFILM Corporation, Tokyo (JP)

(72) Inventor: Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/276,364

(22) Filed: Sep. 26, 2016

(65) Prior Publication Data

US 2017/0013243 A1    Jan. 12, 2017

Related U.S. Application Data

(63) Continuation of application No. PCT/JP2015/057275, filed on Mar. 12, 2015.

(30) Foreign Application Priority Data

Mar. 31, 2014   (JP) .................................. 2014-071681

(51) Int. Cl.
*H04N 5/235* (2006.01)
*H04N 9/73* (2006.01)
(Continued)

(52) U.S. Cl.
CPC ........... *H04N 9/735* (2013.01); *H04N 5/2351* (2013.01); *H04N 5/2354* (2013.01);
(Continued)

(58) Field of Classification Search
CPC ........ H04N 9/735; H04N 9/045; H04N 5/243; H04N 5/2354; H04N 5/23245; H04N 5/2351; H04N 5/2256; H04N 5/23206
See application file for complete search history.

(56) References Cited

U.S. PATENT DOCUMENTS 8,164,648 B2   4/2012   Takahashi
8,704,911 B2   4/2014   Shimizu
(Continued)

FOREIGN PATENT DOCUMENTS

CN    102387372 A    3/2012
JP    2005-033609 A    2/2005
(Continued)

OTHER PUBLICATIONS

International Search Report issued in PCT/JP2015/057275, dated May 12, 2015.
(Continued)

*Primary Examiner* — Padma Haliyur
(74) *Attorney, Agent, or Firm* — Birch, Stewart, Kolasch & Birch, LLP

(57) ABSTRACT

Provided are an image processing device, an imaging device, an image processing method, and a program that can obtain image data subjected to appropriate multi-area white balance processing subsequently while reducing required storage capacity. A white balance gain is acquired for each pixel of original image data (S11). A white balance base value is determined (S12) and a white balance ratio indicating the ratio of the white balance gain to the white balance base value is acquired for each pixel of the original image data (S13). Each pixel value of the original image is multiplied by the white balance ratio to acquire processed image data (S14). Each pixel value of the processed image data is multiplied by the white balance base value to acquire image data in which the white balance gain is applied to each pixel of the original image data.

15 Claims, 19 Drawing Sheets

(51) Int. Cl.
  *H04N 5/243*  (2006.01)
  *H04N 9/04*  (2006.01)
  H04N 5/232  (2006.01)
  H04N 5/225  (2006.01)
(52) U.S. Cl.
  CPC ......... *H04N 5/23245* (2013.01); *H04N 5/243* (2013.01); *H04N 9/045* (2013.01); *H04N 5/2256* (2013.01); *H04N 5/23206* (2013.01)

(56) References Cited

U.S. PATENT DOCUMENTS

2008/0174673 A1  7/2008  Takahashi
2014/0168466 A1* 6/2014  Yoshida ................ H04N 9/735
                                                       348/224.1

FOREIGN PATENT DOCUMENTS

| JP | 2008-109505 A | 5/2008 |
| JP | 2009-4895 A | 1/2009 |
| JP | 2011-71708 A | 4/2011 |
| JP | 2012-165077 A | 8/2012 |

OTHER PUBLICATIONS

Written Opinion of the International Searching Authority issued in PCT/JP2015/057275, dated May 12, 2015.
Chinese Office Action for counterpart Application No. CN 201580017975.8 with English Translation.

* cited by examiner

IMAGE PROCESSING DEVICE, IMAGING DEVICE, IMAGE PROCESSING METHOD, AND PROGRAM

CROSS-REFERENCE TO RELATED APPLICATIONS

This application is a Continuation of PCT International Application No. PCT/JP2015/057275 filed on Mar. 12, 2015, which claims priority under 35 U.S.C. § 119(a) to Japanese Patent Application No. 2014-71681 filed on Mar. 31, 2014. Each of the above applications is hereby expressly incorporated by reference, in their entirety, into the present application.

BACKGROUND OF THE INVENTION

1. Field of the Invention

The present invention relates to an image processing device, an imaging device, an image processing method, and a program, and more particularly, to a multi-area white balance processing technique.

2. Description of the Related Art

Multi-area white balance processing (hereinafter, referred to as "multi-area WB processing") is white balance processing (hereinafter, referred to as "WB processing") that applies different white balance gains (hereinafter, referred to as "WB gains") to each pixel or each area of one image. According to multi-area WB processing, even in an image of an object in which light components are emitted from a plurality of light sources to each pixel (each area) in different proportions, it is possible to accurately correct the color (color balance) of each pixel (each area).

For example, in a case in which flash light is emitted to capture a night portrait scene, an image of a person is captured while being affected by flash light (for example, light including a large amount of blue-wavelength light) and the background (night scene) of the captured image is not substantially affected by the flash light and is affected by other types of environmental light such as light from a sodium lamp (light including a large amount of red-wavelength light). In this case, it is necessary to apply a WB gain for cancelling the influence of flash light to the image of a person in order to obtain a good person image color (color balance) using WB processing. It is necessary to apply a WB gain for cancelling the influence of other types of environmental light to a background image in order to obtain a good background color (color balance). Therefore, in a case in which a common WB gain is applied to all of the pixels forming an image, it is difficult to obtain both a good person color (color balance) and a good background color (color balance).

However, according to multi-area WB processing, a WB gain applied to a person portion and a WB gain applied to a background portion in one image are changed. Therefore, for example, the WB gain applied to each pixel is optimized according to the degree of influence of flash light to obtain both a good person color (color balance) and a good background color (color balance).

JP2012-165077A discloses a white balance control device that can prevent a variation in a white balance control value which is calculated using color information obtained from an object region. The white balance control device detects the object region from an image, divides the image into a plurality of regions, calculates color information indicating the representative colors of regions that overlap the object region, and determines weights. Then, the white balance control device applies the weight determined for each region that overlaps the object region to each color information item, integrates the color information, and calculates a white balance control value at which the representative color becomes a target color from the integration result of the color information and information about a predetermined target color.

In some cases, image data and a WB gain are stored in order to adjust the white balance of an image after the image data is stored.

For example, an imaging device disclosed in JP2009-4895A stores accessory information required for a development process and RAW image data of a main image in a storage medium and can perform auto white balance adjustment when the development process is performed for the RAW image data.

In addition, an image processing device disclosed in JP2008-109505A applies a first white balance coefficient value for a first light source to RAW image data to generate intermediate RAW image data and stores information that can specify a second white balance coefficient value for light sources other than the first light source as white balance information so as to be associated with the intermediate RAW image data. In this way, it is possible to readjust a white balance.

An imaging device disclosed in JP2011-71708A performs a color reproduction process for a RAW image with a first color reproduction parameter that is applied during imaging to generate a developed image and associates data related to the first color reproduction parameter and data related to a second color reproduction parameter which corresponds to the color reproduction of an object under a light source different from the first color reproduction parameter with data of the developed image to generate an image file. Therefore, the first color reproduction parameter and the second color reproduction parameter can be applied to a case in which the developed image is retouched. For example, the first color reproduction parameter makes it possible to perform a process (reverse color reproduction process) that restores the developed image to the state before the color reproduction process and the second color reproduction parameter makes it possible to perform a color reproduction process for the image subjected to the reverse color reproduction process with the first color reproduction parameter.

SUMMARY OF THE INVENTION

As described above, in a case in which RAW image data is developed subsequently, it is necessary to store both the WB gain corresponding to the white balance settings during imaging and the RAW image data in order to reproduce the color (color balance) corresponding to the white balance settings during imaging in the developed image.

Therefore, in a case in which general WB processing that applies a common WB gain to all of the pixels is performed for each of red (R) data, green (G) data, and blue (B) data, it is necessary to store "three types of WB gain data (=three colors (RGB)×one type of WB gain)" corresponding to the white balance settings during imaging together with the RAW image data. In contrast, in multi-area WB processing, different WB gains are applied to each pixel and it is necessary to store different WB gains for each pixel. Therefore, in a case in which the WB gains are applied to each of the R, G, and B data items, it is necessary to store "WB gains corresponding to three colors (RGB)×the number of pixels" corresponding to the white balance settings during imaging together with RAW image data. For example, in a case in which a 16-megapixel (16 M=4609 pixels×3456 pixels) image is captured, it is necessary to store WB gains corresponding to about 16,000,000 pixels (exactly, 15,928,704 pixels) in the multi-area WB processing. Therefore, in the multi-area WB processing, if it is assumed that WB gains corresponding to three colors (R, G, and B data items) are required for each pixel, the amount of WB gain data is about 16,000,000 times (strictly 15,928,704 times) more than that in the related art. In addition, even if a WB gain corresponding to one color is required for each pixel, the amount of WB gain data is about 5,333,333 times (strictly 5,309,568 times) more than that in the related art.

As such, when the technique which stores the WB gain corresponding to the white balance settings during imaging together with image data, such as RAW image data, is applied to multi-area WB processing, it is necessary to ensure a large storage area for the WB gain data, which may cause a storage capacity problem. In addition, there is a demand for adjusting the white balance of image data, such as RAW image data, subsequently, using the multi-area WB processing technique.

The invention has been made in view of the above-mentioned problems and an object of the invention is to provide a technique that can obtain image data subjected to appropriate multi-area white balance processing subsequently while reducing required storage capacity.

An aspect of the invention relates to an image processing device comprising: a gain acquisition unit that acquires a white balance gain for each pixel of original image data; a ratio acquisition unit that determines a white balance base value and acquires a white balance ratio indicating a ratio of the white balance gain to the white balance base value for each pixel of the original image data; and a processed image acquisition unit that multiplies each pixel value of the original image data by the white balance ratio to acquire processed image data.

According to this aspect, the pixel value of the processed image data is multiplied by the white balance base value to obtain image data in which the white balance gain is applied to the pixel value of the original image data. In particular, according to this aspect, it is not necessary to independently store the "WB gains set for each pixel". Therefore, it is possible to accurately perform multi-area WB processing that applies different WB gains to each pixel subsequently while reducing required storage capacity.

The white balance base value can be an arbitrary value. For example, the white balance base value may be a predetermined value or a value that is determined according to the white balance setting mode when the original image data is acquired. For example, in order to acquire processed image data having pixel values whose difference from the pixel values of the original image data is small, it is preferable that the white balance ratio is close to "1", a pixel region in which the white balance ratio is "1" is large, or the pixel region in which the white balance ratio is "1" is maximized as compared to a pixel region in which the white balance ratio has a value other than "1". Therefore, the white balance base value may be determined on the basis of the white balance gain which is acquired for each pixel of the original image data. Alternatively, the white balance base value may be determined on the basis of, for example, the mean or median of the white balance gains allocated to each pixel of the original image data.

Preferably, the image processing device further comprises a light source type determination unit that determines a light source type of the original image data. Preferably, the gain acquisition unit acquires the white balance gain for each pixel of the original image data on the basis of the light source type of the original image data determined by the light source type determination unit.

According to this aspect, it is possible to accurately acquire the white balance gain for each pixel of the original image data on the basis of the light source type of the original image data.

Preferably, the image processing device further comprises a light source type data acquisition unit that acquires first image data indicating an influence of a first light source type and second image data indicating an influence of a second light source type. Preferably, in a case in which the light source types of the original image data determined by the light source type determination unit include the first light source type and the second light source type, the gain acquisition unit acquires the white balance gain for each pixel of the original image data on the basis of the first image data and the second image data.

According to this aspect, it is possible to accurately acquire the white balance gain for each pixel of the original image data on the basis of the first light source type and the second light source type.

Preferably, the image processing device further comprises a flash image acquisition unit that acquires flash emission image data which is captured while flash light is emitted and flash non-emission image data which is captured when flash light is not emitted. Preferably, the light source type data acquisition unit acquires the first image data on the basis of the flash non-emission image data, using the first light source type as environmental light, and acquires the second image data on the basis of the flash emission image data, using the second light source type as flash light.

According to this aspect, it is possible to accurately acquire the white balance gain, considering the influence of the flash light and the environmental light.

Preferably, the light source type data acquisition unit includes: an environmental light gain acquisition unit that acquires a white balance gain for environmental light which is set in a case in which the light source type of the original image data determined by the light source type determination unit is environmental light; a flash light gain acquisition unit that acquires a white balance gain for flash light which is set in a case in which the light source type is flash light; and a flash influence degree acquisition unit that acquires a first brightness value of each pixel of the flash non-emission image data as the first image data, acquires a second brightness value of each pixel of the flash emission image data as the second image data, and acquires a degree of influence of flash on each pixel from the first brightness value and the second brightness value. Preferably, the gain acquisition unit acquires the white balance gain for each pixel of the original image data from the white balance gain for environmental light and the white balance gain for flash light on the basis of the degree of influence of flash.

According to this aspect, it is possible to accurately acquire the white balance gain for each pixel of the original image data on the basis of the degree of influence of flash which is calculated from the brightness values of the flash emission image data and the flash non-emission image data.

Preferably, the ratio acquisition unit determines the white balance base value on the basis of one light source type which is included in the light source types of the original image data determined by the light source type determination unit.

Preferably, the ratio acquisition unit determines the white balance base value on the basis of the environmental light of the original image data determined by the light source type determination unit.

According these aspects, it is possible to simply determine the white balance base value on the basis of one light source type (for example, environmental light) included in the light source types of the original image data.

Preferably, the image processing device further comprises a data recording unit that stores the processed image data and the white balance base value in a storage medium.

According to this aspect, when white balance processing is performed for the processed image data, it is possible to use the white balance base value stored in the storage medium.

Another aspect of the invention relates to an image processing device comprising: a processed data acquisition unit that acquires processed image data, which is acquired by multiplying each pixel value of original image data by a white balance ratio indicating a ratio of a white balance gain to a white balance base value, and the white balance base value from a storage medium; and a white balance processing unit that multiplies each pixel value of the processed image data by the white balance base value to acquire white-balance-adjusted image data.

According to this aspect, it is possible to accurately acquire the white-balance-adjusted image data in which the white balance gain is applied to each pixel.

Still another aspect of the invention relates to an image processing device comprising: a processed data acquisition unit that acquires processed image data, which is acquired by multiplying each pixel value of original image data by a white balance ratio indicating a ratio of a white balance gain to a white balance base value that is determined on the basis of a white balance setting mode when the original image data is acquired, from a storage medium; a setting mode acquisition unit that acquires information about the white balance setting mode when the original image data is acquired; a base value acquisition unit that estimates the white balance base value on the basis of the information about the white balance setting mode when the original image data is acquired; and a white balance processing unit that multiplies each pixel value of the processed image data by the white balance base value estimated by the base value acquisition unit to acquire white-balance-adjusted image data.

According to this aspect, it is possible to accurately acquire the white-balance-adjusted image data in which the white balance gain is applied to each pixel.

A method for estimating the white balance base value on the basis of the information about the white balance setting mode is not particularly limited. The base value acquisition unit may analyze image characteristics, such as the color distribution or the brightness distribution of the processed image data, and estimate the white balance base value on the basis of the analysis result.

Yet another aspect of the invention relates to an image processing device comprising: a processed data acquisition unit that acquires processed image data, which is acquired by multiplying each pixel value of original image data by a white balance ratio indicating a ratio of a white balance gain to a white balance base value that is determined on the basis of a white balance setting mode when the original image data is acquired, from a storage medium; a setting mode acquisition unit that acquires information about the white balance setting mode when the original image data is acquired; a processing mode acquisition unit that acquires information about a white balance processing mode applied to the processed image data; a base value acquisition unit that acquires the white balance base value on the basis of the white balance setting mode in a case in which the white balance processing mode is determined to be the same as the white balance setting mode on the basis of the information about the white balance setting mode and the information about the white balance processing mode and acquires the white balance base value on the basis of the white balance processing mode in a case in which the white balance processing mode is determined to be different from the white balance setting mode; and a white balance processing unit that multiplies each pixel of the processed image data by the white balance base value acquired by the base value acquisition unit to acquire white-balance-adjusted image data.

According to this aspect, it is possible to accurately acquire the white-balance-adjusted image data in which the white balance gain is applied to each pixel.

The "white balance processing mode" is a white balance mode for adjusting the white balance of the processed image data and is not necessarily identical to the white balance setting mode when the original image data is acquired. The "white balance processing mode" is determined by an arbitrary method. The user may determine the white balance processing mode or the image processing device may determine the white balance processing mode on the basis of, for example, various conditions.

Preferably, the white balance setting mode is any one of a preset white balance mode in which the white balance gain is preset, an auto white balance mode in which the white balance gain applied to the original image data is determined on the basis of color distribution information of the original image data, and a custom white balance mode in which the white balance gain applied to the original image data is determined on the basis of color distribution information of reference image data which is different from the original image data.

Preferably, the processed image data is RAW image data.

According to this aspect, for example, when the processed image data (RAW image data) is developed, it is possible to acquire the white-balance-adjusted image data.

Preferably, the processed image data is uncompressed image data.

Preferably, the processed image data is reversibly compressed image data.

Preferably, the processed image data is irreversibly compressed image data.

It is possible to acquire the white-balance-adjusted image data from the processed image data.

Still yet another aspect of the invention relates to an imaging device comprising an imaging element and the above-mentioned image processing device. The original image data is acquired by the imaging element.

Yet still another aspect of the invention relates to an image processing method comprising: acquiring a white balance gain for each pixel of original image data; determining a white balance base value and acquiring a white balance ratio indicating a ratio of the white balance gain to the white balance base value for each pixel of the original image data; and multiplying each pixel value of the original image data by the white balance ratio to acquire processed image data.

Still yet another aspect of the invention relates to an image processing method comprising: acquiring processed image data, which is acquired by multiplying each pixel value of original image data by a white balance ratio indicating a ratio of a white balance gain to a white balance base value, and the white balance base value from a storage medium;

and multiplying each pixel value of the processed image data by the white balance base value to acquire white-balance-adjusted image data.

Yet still another aspect of the invention relates to an image processing method comprising: acquiring processed image data, which is acquired by multiplying each pixel value of original image data by a white balance ratio indicating a ratio of a white balance gain to a white balance base value that is determined on the basis of a white balance setting mode when the original image data is acquired, from a storage medium; acquiring information about the white balance setting mode when the original image data is acquired; estimating the white balance base value on the basis of the information about the white balance setting mode when the original image data is acquired; and multiplying each pixel value of the processed image data by the estimated white balance base value to acquire white-balance-adjusted image data.

Still yet another aspect of the invention relates to an image processing method comprising: acquiring processed image data, which is acquired by multiplying each pixel value of original image data by a white balance ratio indicating a ratio of a white balance gain to a white balance base value that is determined on the basis of a white balance setting mode when the original image data is acquired, from a storage medium; acquiring information about the white balance setting mode when the original image data is acquired; acquiring information about a white balance processing mode applied to the processed image data; acquiring the white balance base value on the basis of the white balance setting mode in a case in which the white balance processing mode is determined to be the same as the white balance setting mode on the basis of the information about the white balance setting mode and the information about the white balance processing mode, and acquiring the white balance base value on the basis of the white balance processing mode in a case in which the white balance processing mode is determined to be different from the white balance setting mode; and multiplying each pixel of the processed image data by the acquired white balance base value to acquire white-balance-adjusted image data.

Yet still another aspect of the invention relates to a program that causes a computer to perform: a step of acquiring a white balance gain for each pixel of original image data; a step of determining a white balance base value and acquiring a white balance ratio indicating a ratio of the white balance gain to the white balance base value for each pixel of the original image data; and a step of multiplying each pixel value of the original image data by the white balance ratio to acquire processed image data.

Still yet another aspect of the invention relates to a program that causes a computer to perform: a step of acquiring processed image data, which is acquired by multiplying each pixel value of original image data by a white balance ratio indicating a ratio of a white balance gain to a white balance base value, and the white balance base value from a storage medium; and a step of multiplying each pixel value of the processed image data by the white balance base value to acquire white-balance-adjusted image data.

Yet still another aspect of the invention relates to a program that causes a computer to perform: a step of acquiring processed image data, which is acquired by multiplying each pixel value of original image data by a white balance ratio indicating a ratio of a white balance gain to a white balance base value that is determined on the basis of a white balance setting mode when the original image data is acquired, from a storage medium; a step of acquiring information about the white balance setting mode when the original image data is acquired; a step of estimating the white balance base value on the basis of the information about the white balance setting mode when the original image data is acquired; and a step of multiplying each pixel value of the processed image data by the estimated white balance base value to acquire white-balance-adjusted image data.

Still yet another aspect of the invention relates to a program that causes a computer to perform: a step of acquiring processed image data, which is acquired by multiplying each pixel value of original image data by a white balance ratio indicating a ratio of a white balance gain to a white balance base value that is determined on the basis of a white balance setting mode when the original image data is acquired, from a storage medium; a step of acquiring information about the white balance setting mode when the original image data is acquired; a step of acquiring information about a white balance processing mode applied to the processed image data; a step of acquiring the white balance base value on the basis of the white balance setting mode in a case in which the white balance processing mode is determined to be the same as the white balance setting mode on the basis of the information about the white balance setting mode and the information about the white balance processing mode, and acquiring the white balance base value on the basis of the white balance processing mode in a case in which the white balance processing mode is determined to be different from the white balance setting mode; and a step of multiplying each pixel of the processed image data by the acquired white balance base value to acquire white-balance-adjusted image data.

According to the invention, the white balance gain which is set for each pixel is reflected in each pixel value of the processed image data. Therefore, it is possible to obtain image data subjected to appropriate multi-area white balance processing subsequently while reducing required storage capacity.

DESCRIPTION OF THE PREFERRED EMBODIMENTS

Embodiments of the invention will be described with reference to the drawings. In the following embodiments, an example in which the invention is applied to a digital camera (imaging device) will be described. However, the invention can be applied to an image processing device, an imaging device, an image processing method, and a program, in addition to the digital camera.

Figure 1:
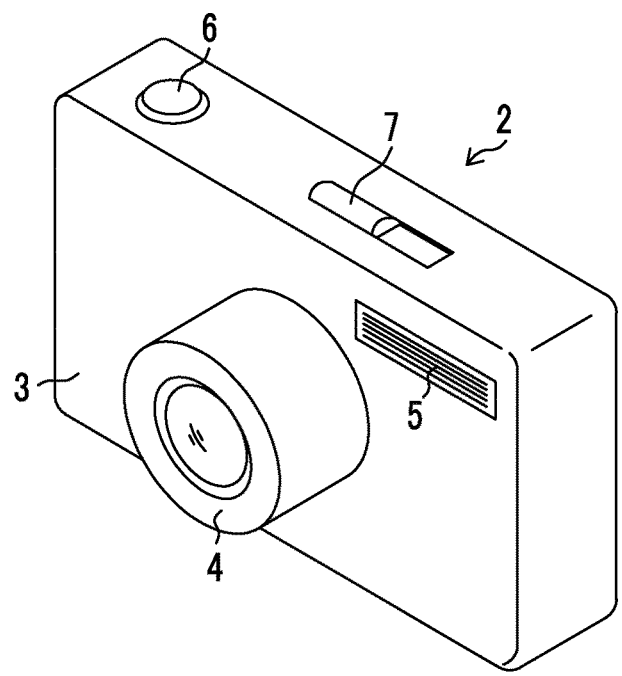
FIG. 1 is a front perspective view illustrating a digital camera.
Figure 2:
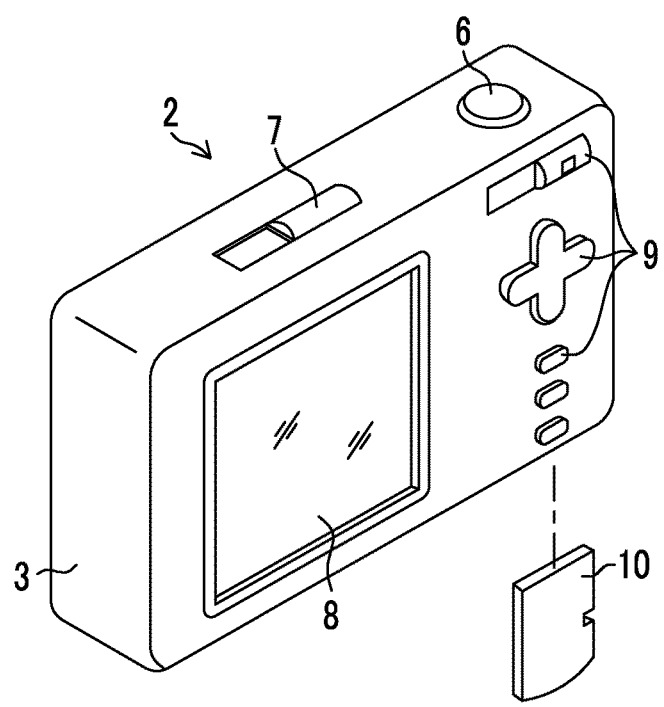
FIG. 2 is a rear perspective view illustrating the digital camera.

FIG. 1 is a front perspective view illustrating a digital camera 2 and FIG. 2 is a rear perspective view illustrating the digital camera 2.

The digital camera 2 comprises a camera body 3 and a lens barrel 4 that is attached to a front surface of the camera body 3. The lens barrel 4 and the camera body 3 may be integrally provided or may be detachably provided as an interchangeable lens camera.

In addition to the lens barrel 4, a flash light emitting unit 5 is provided on the front surface of the camera body 3. A shutter button 6 and a power switch 7 are provided on an upper surface of the camera body 3. The shutter button 6 is an imaging instruction unit that receives an imaging instruction from a user. The power switch 7 is a power switching unit that receives an instruction to turn on and off the digital camera 2 from the user.

A display unit 8 which is, for example, a liquid crystal panel and an operating unit 9 which is directly operated by the user are provided on a rear surface of the camera body 3. The display unit 8 displays a live view image (through image) in an imaging standby state to function as an electronic viewfinder and functions as a reproduction image display unit when a captured image or a memory-stored image is reproduced.

The operating unit 9 is an arbitrary operating device, such as a mode switch, a cross key, and an execution key. For example, the mode switch is operated by the user to switch the operation mode of the digital camera 2. Examples of the operation mode of the digital camera 2 include an imaging mode in which an image of an object is captured to obtain a captured image and a playback mode in which an image is played back and displayed. Examples of the imaging mode include an auto focus (AF) mode in which auto focus is performed and a manual focus (MF) mode in which a manual focus operation is performed. The cross key and the execution key are operated by the user to display a menu screen or a setting screen on the display unit 8, to move a cursor displayed on the menu screen or the setting screen, or to confirm various types of settings of the digital camera 2.

A memory slot into which a main memory 10 is inserted and a cover that opens and closes an opening of the memory slot are provided at the bottom (not illustrated) of the camera body 3. The main memory 10 is detachably provided in the camera body 3. When the main memory 10 is inserted into the camera body 3, it is electrically connected to a storage control unit 33 provided in the camera body 3. The main memory 10 can be generally a semiconductor memory, such as a card-type flash memory. The main memory 10 is not particularly limited. For example, a recording medium of an arbitrary storage type, such as a magnetic medium, can be used as the main memory 10.

Figure 3:
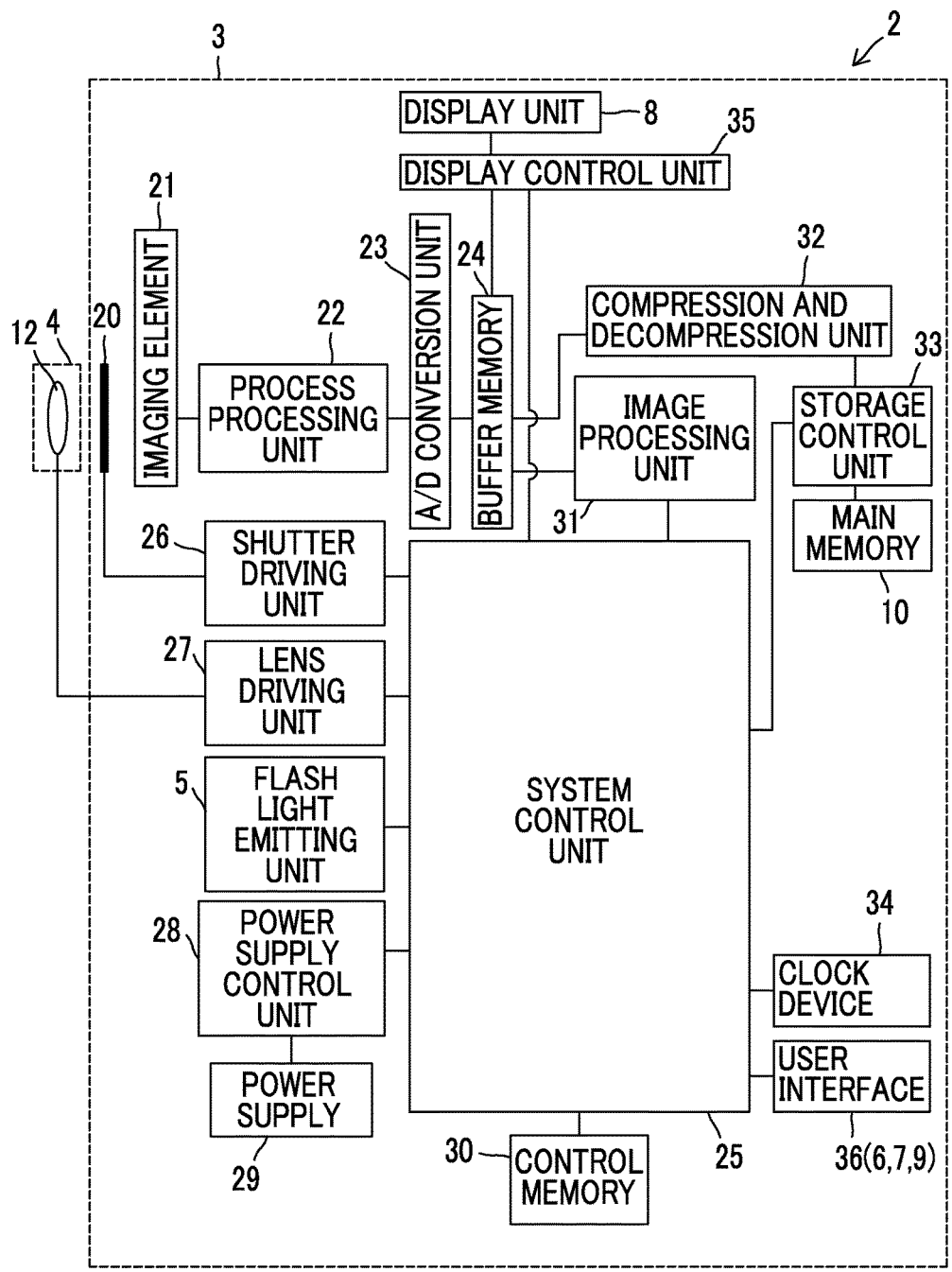
FIG. 3 is a block diagram illustrating a control processing system of the digital camera.

FIG. 3 is a block diagram illustrating a control processing system of the digital camera 2.

Object light passes through a lens unit 12 that is provided in the lens barrel 4 and a mechanical shutter 20 that is provided in the camera body 3 and is received by an imaging element 21. The imaging element 21 is an element that receives the object image and generates image data and includes color filters, such as red, green, and blue (R, G, and B) filters, and an image sensor, such as a charge coupled device (CCD) or a complementary metal oxide semiconductor (CMOS), which converts an optical image into an electric signal. For example, an automatic gain control (AGC) circuit of a process processing unit 22 performs process processing for image data that is output from the imaging element 21 and an A/D conversion unit 23 converts analog image data into digital image data. The digital image data is stored in a buffer memory 24.

The buffer memory 24 is an area that temporarily stores the image data and is, for example, a dynamic random access memory (DRAM). The image data that has been transmitted from the A/D conversion unit 23 and then stored in the buffer memory 24 is read by an image processing unit (image processing device) 31 which is controlled by a system control unit 25. The image processing unit 31 performs various types of image processing, such as a gamma correction process and a demosaic process, using the image data generated by the imaging element 21 as input image data, and stores the image data subjected image processing in the buffer memory 24 again.

The image data which has been subjected to the image processing by the image processing unit 31 and then stored in the buffer memory 24 is read by a display control unit 35 and a compression and decompression unit 32. The display control unit 35 controls the display unit 8 such that the image data read from the buffer memory 24 is displayed on the display unit 8. As such, the image data which has been output from the imaging element 21 and then subjected to the image processing by the image processing unit 31 is displayed as an imaging check image (post-view image) on the display unit 8.

The compression and decompression unit 32 compresses the image data read from the buffer memory 24 to create image data with an arbitrary compression format, such as Joint Photographic Experts Group (JPEG) or Tagged Image File Format (TIFF). The compressed image data is stored in the main memory 10 by the storage control unit 33 that controls a process of storing data in the main memory (storage medium) 10 and a process of reading data from the main memory 10. In a case in which a data type, such as image data, is stored in the main memory 10, the storage control unit 33 adds imaging information, such as editing date and time information (update date and time information), or other kinds of related information to the data type, on the basis of date and time information acquired from a clock device 34 which will be described below. The imaging information is added to the image data in any format. For example, an exchangeable image file format (Exit) can be used.

In the playback mode in which the image data stored in the main memory 10 is played back, the image data stored in the main memory 10 is read by the storage control unit 33 that is controlled by the system control unit 25, is decompressed by the compression and decompression unit 32, and is then stored in the buffer memory 24. The image data is read from the buffer memory 24 by the display control unit 35 and is played back and displayed on the display unit 8 in the same order as that in which a captured image is checked and displayed.

As described above, the system control unit 25 controls the buffer memory 24, the image processing unit 31, and the storage control unit 33. In addition, the system control unit 25 controls other units in the digital camera 2. For example, the system control unit 25 controls a lens driving unit 27 to control the driving of the lens unit 12 and controls a shutter driving unit 26 to control the driving of the mechanical shutter 20. In addition, the system control unit 25 controls the imaging element 21 to control the output of the image data. Further, the system control unit 25 controls the flash light emitting unit 5 to control the emission or non-emission of flash light, and controls a power control unit 28 to detect, for example, whether a battery is mounted on a power supply 29, the type of battery, and a remaining battery level. Furthermore, the system control unit 25 acquires the date and time information which is counted by the clock device 34 and uses the date and time information in various types of processes. In addition, the system control unit 25 controls various processing units forming the image processing unit 31.

The system control unit 25 acquires an operation signal from a user interface 36 including the shutter button 6, the power switch 7, and the operating unit 9 and performs various types of processes and device control corresponding to the operation signal. For example, the system control unit 25 controls the shutter driving unit 26 to control the opening and closing of the mechanical shutter 20 in response to a release signal received from the shutter button 6. Furthermore, the system control unit 25 controls the power control unit 28 to control the turn-on and tune-off of the power supply 29 in response to a power on/off signal received from the power switch 7.

Programs or data types required for various types of processes and device control performed by the system control unit 25 are stored in a control memory 30. The system control unit 25 can read the programs or the data types stored in the control memory 30, if necessary. In addition, the system control unit 25 can store a new program or a new data type in the control memory 30. For example, the system control unit 25 can write condition data, such as the type of set white balance mode (hereinafter, referred to as a "WB mode") or a WB gain, to the control memory 30. The system control unit 25 can control the display control unit 35 such that various kinds of information acquired from each unit are displayed on the display unit 8. In addition, the system control unit 25 can change various kinds of information to be displayed on the display unit 8, in response to an operation signal which is input from the user through the user interface 36.

Next, for WB processing for the original image data acquired by the imaging element 21, an example of image processing will be described.

In each of the following embodiments, an example in which "RAW image data" that has been output from the imaging element 21 and passed through the process processing unit 22 (process processing) and the A/D conversion unit 23 (A/D conversion process) is input to the image processing unit 31 through the buffer memory 24 and is used as original image data and processed image data will be described. Therefore, the demosaic process of the image processing unit 31 for the following original image data and processed image data (RAW image data) is skipped. The original image data and the processed image data are not limited to the "RAW image data" and the same image processing can be performed for image data with any other formats, such as a JPEG format and TIFF.

In general, there is a type of digital camera that can store RAW image data which is "image data before image quality processing" or "image data subjected to only image quality processing (for example, lens shading correction) caused by an imaging system" in a storage medium (main memory 10), instead of or in addition to a processed image such as a JPEG image subjected to image quality processing. The storage of the RAW image data makes it possible for the user to perform image quality processing and a development process for the RAW image data subsequently, using RAW development software, and to obtain images with different image qualities, without taking a picture again. In a case in which the RAW image data is stored in the storage medium, the digital camera also stores information (for example, information about imaging conditions and the type of digital camera) required to develop the RAW image data in the storage medium. A method for storing the "RAW image data" and "information data required for development" is not particularly limited. Data in which information data required for development or other information is added as tag information (meta data) to the "RAW image data" may be stored in the storage medium. In the following embodiments, data in which tag information (meta data) is added to RAW image data is referred to as "RAW data".

A compression format of the processed image data to be stored in the main memory 10 is not particularly limited. The processed image data may be uncompressed image data, reversibly-compressed image data, or irreversibly-compressed image data. In a case in which the processed image data is RAW image data, a development process may be performed before WB processing (see a "white balance processing unit (WB processing unit) 62" which will be described below) or after the WB processing. In a case in which the processed image data is compressed image data (reversibly-compressed image data or irreversibly-compressed image data), it is preferable that a decompression process is performed before WB processing (see the "WB processing unit 62" which will be described below). The development process and the decompression process may be performed by, for example, a processed data acquisition unit 60 which will be described below.

First Embodiment

An image processing unit 31 according to this embodiment acquires a base WB gain (hereinafter, referred to as a "white balance base value (WB base value)") and a WB gain which is suitable for each pixel forming the original image data and multiplies each pixel value of the original image data by the ratio of the WB gain suitable for each pixel to the WB base value to acquire processed image data.

Figure 4:
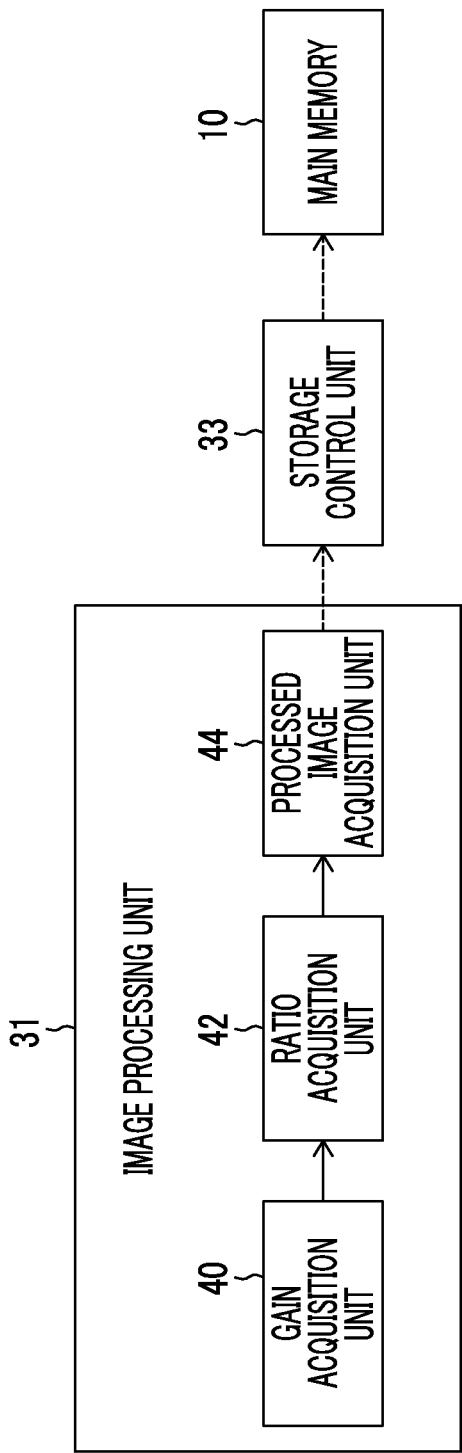
FIG. 4 is a block diagram illustrating an example of the functional structure of an image processing unit according to a first embodiment.

FIG. 4 is a block diagram illustrating an example of the functional structure of the image processing unit 31 according to the first embodiment. The image processing unit 31 according to this embodiment includes a gain acquisition unit 40, a ratio acquisition unit 42, and a processed image acquisition unit 44.

The gain acquisition unit 40 acquires a WB gain for each pixel of the original image data. The ratio acquisition unit 42 determines a WB base value and acquires a white balance ratio (hereinafter, referred to as a "WB ratio") indicating the ratio of the WB gain to the WB base value for each pixel of the original image data. The processed image acquisition unit 44 multiplies each pixel value of the original image data by the WB ratio to acquire processed image data. The processed image data is output from the processed image acquisition unit 44 (image processing unit 31) and is stored in the main memory 10 through the buffer memory 24, the compression and decompression unit 32, and the storage control unit 33 (see FIG. 3). As such, in this embodiment, the storage control unit 33 functions as a data recording unit that stores the processed image data in the main memory (storage medium) 10.

An example of the content of the process of the image processing unit 31 is referred to in the following embodiments (for example, a third embodiment and a fourth embodiment).

Figure 5:
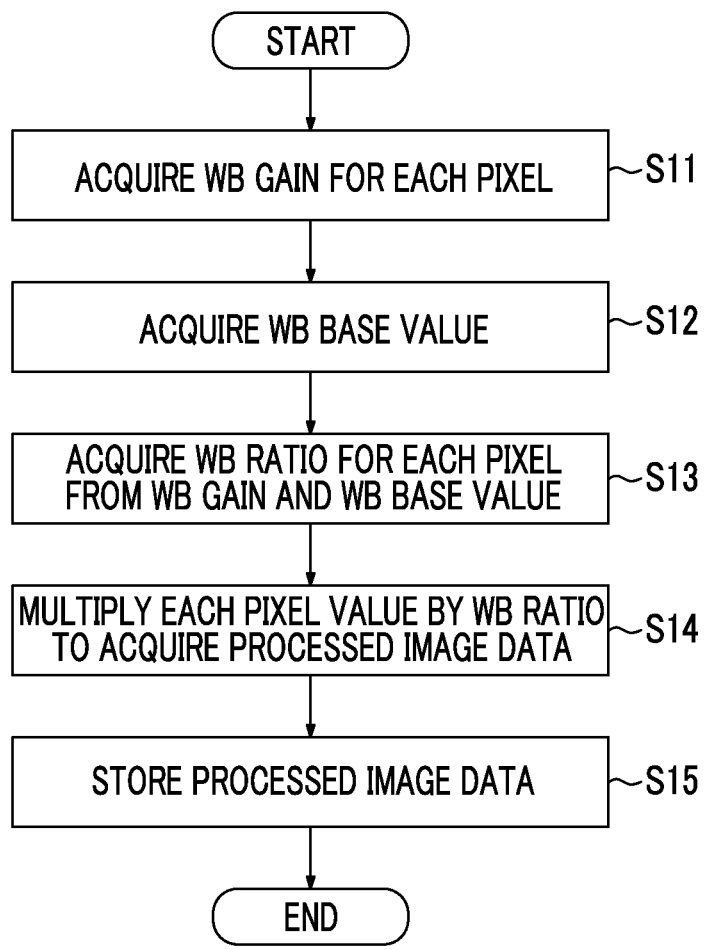
FIG. 5 is a flowchart illustrating the flow of image processing according to the first embodiment.

FIG. 5 is a flowchart illustrating the flow of image processing according to the first embodiment.

First, the gain acquisition unit 40 acquires a WB gain that is most suitable for each pixel of the original image data (see S11 in FIG. 5).

Then, the ratio acquisition unit 42 acquires a WB base value (S12) and acquires a WB ratio indicating the ratio of the WB gain acquired by the gain acquisition unit 40 to the WB base value for each pixel of the original image data (S13). For example, in a case in which the WB base value is represented by "WBbase", the WB gain suitable for each pixel of the original image data is represented by "WB_ij (where "i" indicates an X-axis value and "j" indicates a Y-axis value in a case in which a pixel position is represented by the X-axis value and the Y-axis value)", and the WB ratio is represented by "WBratio_ij (where "i" indicates an X-axis value and "j" indicates a Y-axis value in a case in which a pixel position is represented by the X-axis value and the Y-axis value)", the WB ratio "WBratio_ij" can be represented by the following Expression 1.

$$\text{WBratio\_}ij = \text{WB\_}ij/\text{WBbase} \qquad [\text{Expression 1}]$$

Then, the processed image acquisition unit 44 multiplies each pixel value of the original image data by the WB ratio to acquire processed image data (S14). For example, in a case in which the pixel value of the original image data is represented by "V_ij (where "i" indicates an X-axis value and "j" indicates a Y-axis value in a case in which a pixel position is represented by the X-axis value and the Y-axis value)" and the pixel value of the processed image data is represented by "P_ij (where "i" indicates an X-axis value and "j" indicates a Y-axis value in a case in which a pixel position is represented by the X-axis value and the Y-axis value)", each pixel value "P_ij" of the processed image data can be represented by the following Expression 2.

$$\begin{aligned} P\_ij &= V\_ij \times \text{WBratio\_}ij \qquad [\text{Expression 2}] \\ &= V\_ij \times \text{WB\_}ij/\textit{WBbase} \end{aligned}$$

Then, the processed image data is output from the image processing unit 31 (processed image acquisition unit 44), is transmitted to the storage control unit 33 through the buffer memory 24 and the compression and decompression unit 32 under the control of the system control unit 25, and is stored in the main memory 10 by the storage control unit 33 (S15). In this embodiment, the WB base value determined by the ratio acquisition unit 42 is not stored in the main memory 10.

As described above, according to this embodiment, the processed image data having the pixel value P_ij (see Expression 2) in which the WB gain WB_ij suitable for each pixel is reflected is stored in the main memory 10. Therefore, it is possible to obtain image data (pixel value K_ij (where "i" indicates an X-axis value and "j" indicates a Y-axis value in a case in which a pixel position is represented by the X-axis value and the Y-axis value)"), to which the WB gain suitable for each pixel is applied, just by reading the processed image data from the main memory 10 and multiplying each pixel value P_ij of the processed image data by the WB base value WBbase, as shown in the following Expression 3.

$$\begin{aligned} K\_ij &= P\_ij \times \textit{WBbase} \qquad [\text{Expression 3}] \\ &= V\_ij \times \text{WB\_}ij/\textit{WBbase} \times \textit{WBbase} \\ &= V\_ij \times \text{WB\_}ij \end{aligned}$$

Therefore, even if the processed image data is RAW image data, it is possible to simply obtain image data, to which the WB gain suitable for each pixel is applied, just by the execution of the process represented by Expression 3 by RAW development software that is used during a development process (see a fifth embodiment (FIG. 13) which will be described below). As such, since the processed image data in which the WB gain suitable for each pixel is reflected is stored in the main memory 10, it is possible to obtain image data subjected to appropriate multi-area WB processing subsequently.

In this embodiment, the WB gain suitable for each pixel is reflected in each pixel value of the processed image data stored in the main memory 10 and it is not necessary to store the "WB gain for each pixel" separately from the processed image data. That is, in this embodiment, when the WB base value is stored together with the processed image data, it is not necessary to store the WB gain set for each pixel. Therefore, it is possible to obtain image data subjected to appropriate multi-area WB processing subsequently, using the amount of data stored that is substantially the same as that in a case in which the WB gain for each pixel is not stored. As such, according to this embodiment, it is possible to significantly reduce the amount of data to be stored, as compared to a case in which the "WB gain suitable for each pixel" is stored separately from the processed image data, and to effectively prevent an increase in the amount of data stored.

In some cases, the amount of correction in a lens shading correction process or an imaging correction process varies depending on the pixel position of an image. However, since these processes are correction processes depending on the settings of the digital camera 2 during imaging, an increase in the amount of data stored can be prevented by, for example, a technique that creates a function for the correction process in advance. However, the "WB gain suitable for each pixel" in the multi-area WB processing varies depending on the scene to be captured. Therefore, it is difficult to create a function for the multi-area WB processing in advance, which is likely to cause an increase in the amount of data stored. In contrast, according to this embodiment, it is possible to obtain the effect of the multi-area WB processing using a simple process, with little increase in the amount of data stored.

Second Embodiment

In this embodiment, the detailed description of the same or similar structure and operation as those in the first embodiment will not be repeated.

An image processing unit 31 according to this embodiment has the same functional structure as the image processing unit 31 (see FIG. 4) according to the first embodiment.

However, in this embodiment, data (RAW data) in which a WB base value used to create processed image data is added as tag information to the processed image data is stored in the main memory 10. That is, the processed image data output from the image processing unit 31 (processed image acquisition unit 44) and the WB base value are transmitted to the storage control unit (data recording unit) 33 and the storage control unit 33 stores the processed image data and the WB base value in the main memory (storage medium) 10 so as to be associated with each other.

Figure 6:
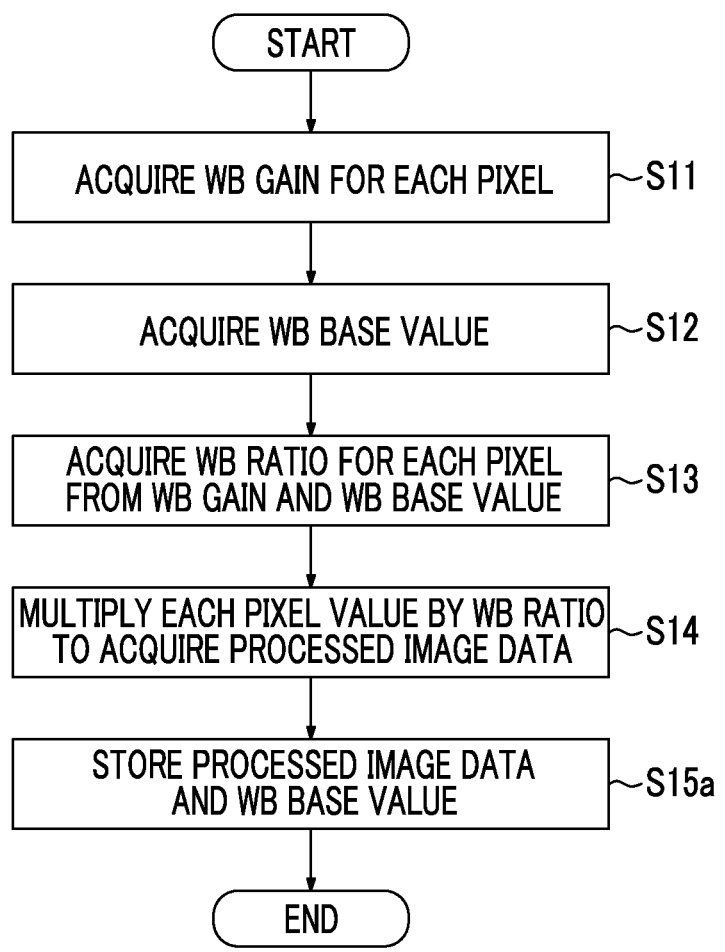
FIG. 6 is a flowchart illustrating the flow of image processing according to a second embodiment.

FIG. 6 is a flowchart illustrating the flow of image processing according to the second embodiment.

In this embodiment, similarly to the first embodiment (see FIG. 5), a WB gain that is most suitable for each pixel of the original image data is acquired (S11), a WB base value is acquired (S12), and a WB ratio indicating the ratio of the WB gain acquired by the gain acquisition unit 40 to the WB base value is acquired for each pixel of the original image data (S13). Each pixel value of the original image data is multiplied by the WB ratio to acquire processed image data (S14).

However, in this embodiment, the processed image data and the WB base value are output from the image processing unit 31, are transmitted to the storage control unit 33 through the buffer memory 24 and the compression and decompression unit 32 under the control of the system control unit 25, and are stored in the main memory 10 by the storage control unit 33 (S15a in FIG. 6). In the stage in which the processed image data and the WB base value are output from the image processing unit 31 (processed image acquisition unit 44), the WB base value may be added as tag information to the processed image data. However, the WB base value is not necessarily transmitted from the image processing unit 31 to the storage control unit 33 together with the processed image data. For example, the WB base value may be transmitted from the system control unit 25 to the storage control unit 33. That is, the processed image data to which the WB base value is not added may be output to the image processing unit 31 (processed image acquisition unit 44) and the WB base value may be added as tag information to the processed image data the storage control unit 33.

As described above, according to this embodiment, the processed image data in which the WB gain suitable for each pixel is reflected and the WB base value WBbase are stored in the main memory 10. Therefore, it is possible to obtain appropriate image data (pixel value K_ij), to which the WB gain suitable for each pixel has been applied, just by reading the processed image data and the WB base value WBbase from the main memory 10 and multiplying each pixel value P_ij of the processed image data by the WB base value WBbase, as shown in Expression 3.

In this embodiment, it is not necessary to store a "WB gain such as a multi-area WB gain most suitable for each pixel" separately from the processed image data. Therefore, it is possible to obtain image data subjected to appropriate multi-area WB processing subsequently, using the amount of data stored that is substantially the same as that in a case in which the WB gain for each pixel is not stored.

Third Embodiment

In this embodiment, the detailed description of the same or similar structure and operation as those in the first and second embodiments will not be repeated.

Figure 7:
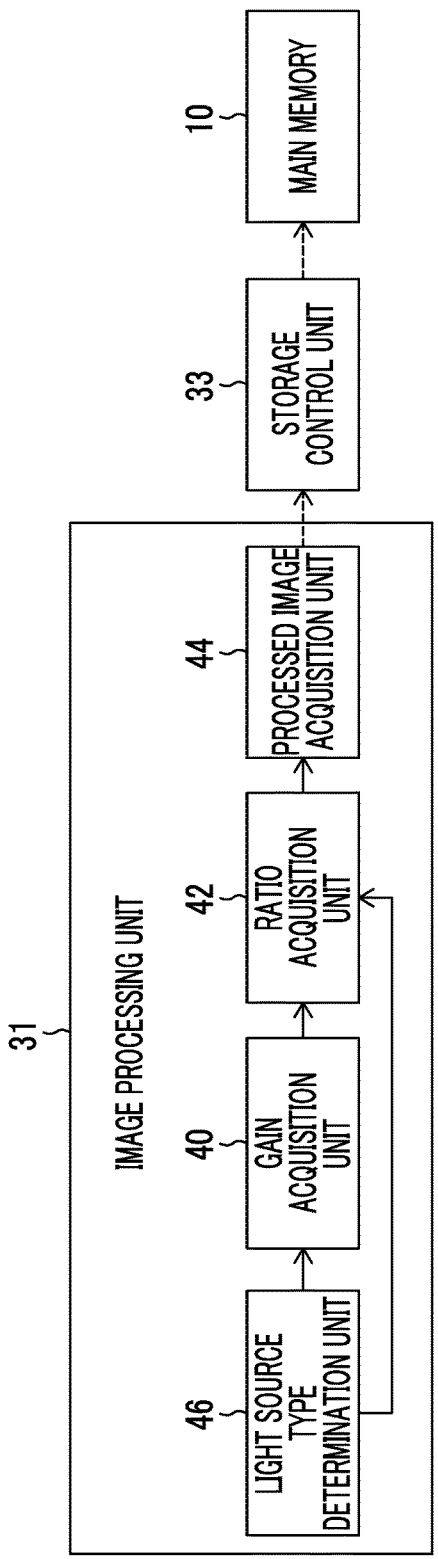
FIG. 7 is a block diagram illustrating an example of the functional structure of an image processing unit according to a third embodiment.

FIG. 7 is a block diagram illustrating an example of the functional structure of an image processing unit 31 according to a third embodiment.

The image processing unit 31 according to this embodiment includes a light source type determination unit 46 that determines a light source type of the original image data, in addition to the gain acquisition unit 40, the ratio acquisition unit 42, and the processed image acquisition unit 44.

A method for determining the light source type of the original image data is not particularly limited. For example, the light source type determination unit 46 may analyze the original image data to determine the light source type. In a case in which flash light is emitted to take a photograph, the light source type determination unit 46 may determine that the light source types of the original image data include flash light and environmental light.

Information about the light source type of the original image data determined by the light source type determination unit 46 is transmitted to the gain acquisition unit 40 and the ratio acquisition unit 42.

The gain acquisition unit 40 acquires the WB gain for each pixel of the original image data on the basis of the light source type of the original image data determined by the light source type determination unit 46. For example, in a case in which the light source type of the original image data is flash light and environmental light, the gain acquisition unit 40 may use predetermined data stored in a memory (for example, the control memory 30 illustrated in FIG. 3) as the WB gain of the type of the source of the flash light. In addition, the gain acquisition unit 40 may calculate the WB gain of the type of the source of the environmental light from flash emission image data and flash non-emission image data.

The ratio acquisition unit 42 determines a WB base value on the basis of one light source type included in the light source types of the original image data determined by the light source type determination unit 46. The ratio acquisition unit 42 according to this embodiment determines the WB base value on the basis of the environmental light of the original image data determined by the light source type determination unit 46.

According to this embodiment, in a case in which the user wants to acquire image data to which multi-area WB processing is to be applied in the future, the WB base value is preferably set on the basis of "one light source type (environmental light) included in the light source types of the original image data". Therefore, the user can sensuously perform multi-area WB processing, which is convenient. For example, in a case in which the original image data is image data obtained by capturing a scene while emitting flash light, the user can set the WB base value according to a light source of the background.

Similarly to the first embodiment, the WB base value is not stored in the main memory 10. However, the processed image data may be stored in the main memory 10. Similarly to the second embodiment, the processed image data and the WB base value may be stored in the main memory 10.

Fourth Embodiment

In this embodiment, the detailed description of the same or similar structure and operation as those in the first to third embodiments will not be repeated.

Figure 8:
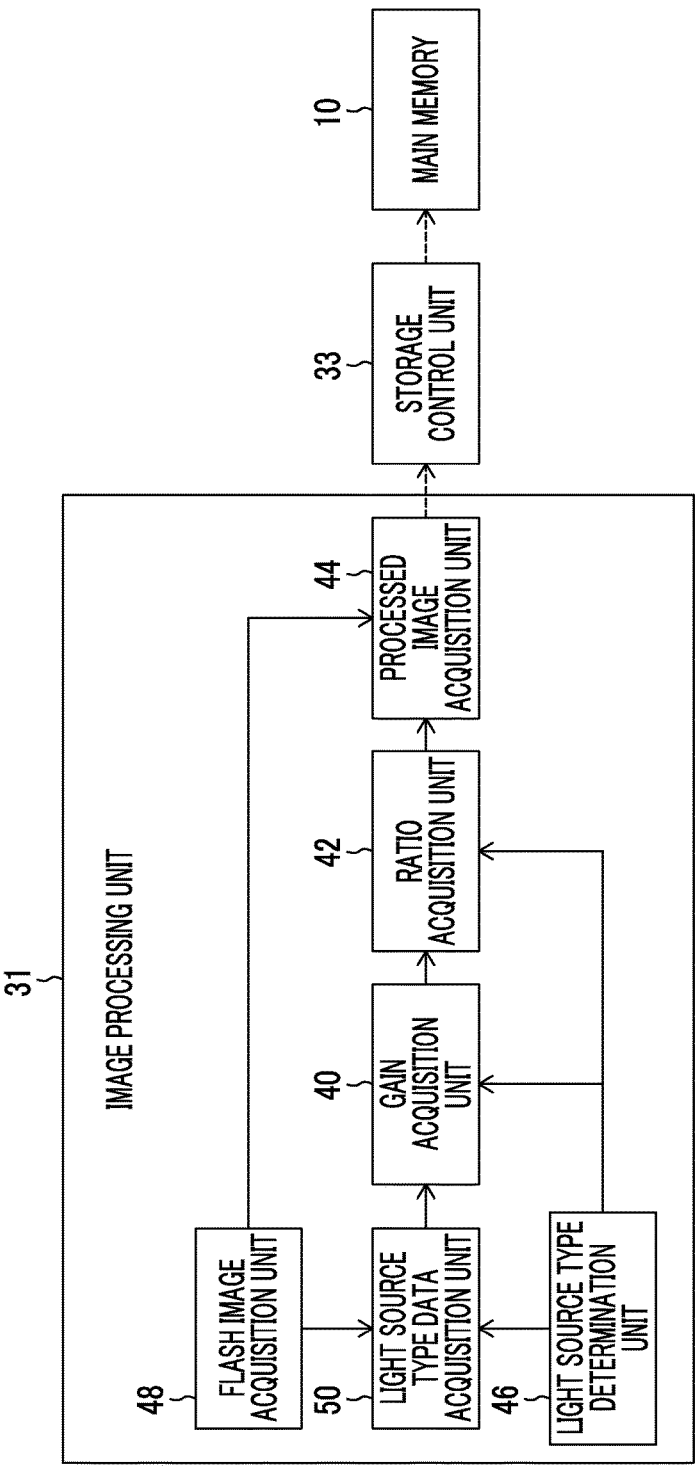
FIG. 8 is a block diagram illustrating an example of the functional structure of an image processing unit according to a fourth embodiment.

FIG. 8 is a block diagram illustrating an example of the functional structure of an image processing unit 31 according to a fourth embodiment.

The image processing unit 31 according to this embodiment includes a flash image acquisition unit 48 and a light source type data acquisition unit 50, in addition to the gain acquisition unit 40, the ratio acquisition unit 42, the processed image acquisition unit 44 and the light source type determination unit 46.

The flash image acquisition unit 48 acquires flash emission image data which is captured while flash light is emitted and flash non-emission image data which is obtained by capturing an image of the same object as that in the flash emission image data, when flash light is not emitted. That is, in this embodiment, when the user presses the shutter button 6 (see FIGS. 1 and 2) in order to acquire the flash emission image data, the system control unit 25 (see FIG. 3) controls, for example, the imaging element 21, while controlling the emission of light from the flash light emitting unit 5, such that an imaging process using flash light and an imaging process without using flash light are automatically and continuously performed. The flash image acquisition unit 48 acquires the flash emission image data and the flash non-emission image data captured by these imaging processes.

The light source type data acquisition unit 50 acquires first image data indicating the influence of environmental light (first light source type) and second image data indicating the influence of flash light (second light source type). That is, the light source type data acquisition unit 50 acquires the first image data on the basis of the flash non-emission image data acquired by the flash image acquisition unit 48, using the first light source type as environmental light, and acquires the second image data on the basis of the flash emission image data, using the second light source type as flash light.

The first image data and the second image data are not particularly limited. For example, the "flash non-emission image data" may be used as the first image data indicating the influence of environmental light. In addition, "image data indicating the difference between the pixel values of the flash emission image data and the flash non-emission image data" may be used as the second image data indicating the influence of flash light.

Whether to emit flash light is set by the user through the user interface 36 or is determined by the system control unit 25 on the basis of the detection result of a photometric sensor (not illustrated) that detects the brightness of a captured scene. In both cases, the system control unit 25 has information about whether flash light is emitted. Therefore, in a case in which environmental light and flash light are used as the first light source type and the second light source type of the original image data as in this embodiment, the light source type determination unit 46 may acquire the information about whether flash light is emitted from the system control unit 25 and determine the light source type of the original image data.

The determination result of the light source type of the original image data by the light source type determination unit 46 is transmitted to the gain acquisition unit 40 and ratio acquisition unit 42 and the light source type data acquisition unit 50. The light source type data acquisition unit 50 acquires the first image data and the second image data on the determination result of the light source type determination unit 46.

In a case in which the light source types of the original image data determined by the light source type determination unit 46 include environmental light (first light source type) and flash light (second light source type), the gain acquisition unit 40 acquires the WB gain for each pixel of the original image data on the basis of the first image data and the second image data.

Figure 9:
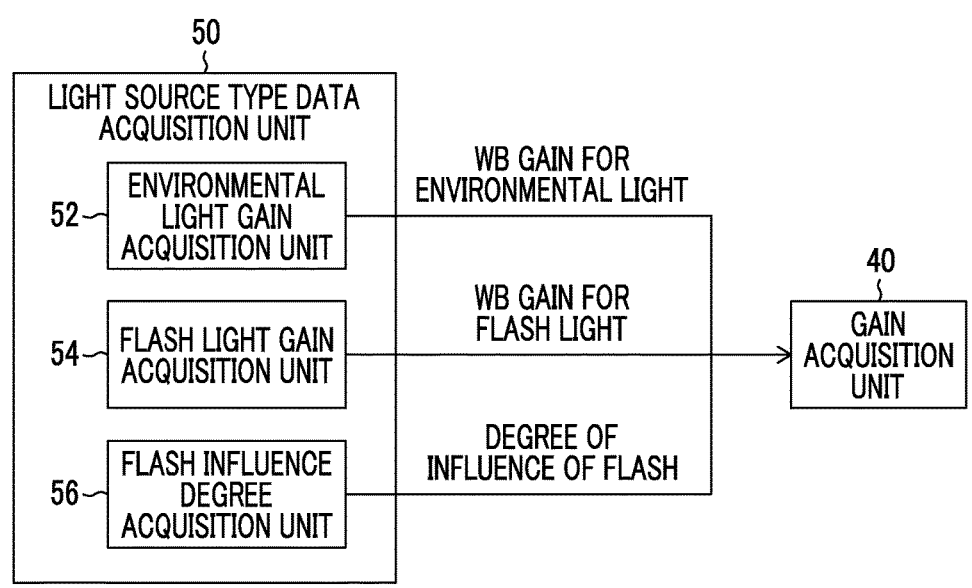
FIG. 9 is a block diagram illustrating an example of the functional structure of a light source type data acquisition unit and a gain acquisition unit according to the fourth embodiment.

FIG. 9 is a block diagram illustrating an example of the functional structure of the light source type data acquisition unit 50 and the gain acquisition unit 40 according to the fourth embodiment.

In this embodiment, the light source type data acquisition unit 50 includes an environmental light gain acquisition unit 52, a flash light gain acquisition unit 54, and a flash influence degree acquisition unit 56.

The environmental light gain acquisition unit 52 acquires a white balance gain for environmental light (hereinafter, referred to as a "WB gain for environmental light") which is set in a case in which the light source type of the original image data determined by the light source type determination unit 46 is environmental light. For example, the environmental light gain acquisition unit 52 calculates a WB gain for an auto white balance mode (hereinafter, referred to as an "AWB gain") from the color distribution and brightness value of the flash non-emission image data, using a general method, and can use the AWB gain as the WB gain for environmental light. The AWB gain can be calculated by any method. For example, the environmental light gain acquisition unit 52 may analyze the flash non-emission image data to obtain color distribution information from R, G, and B pixel values and set a gain at which the mean is an achromatic color as the AWB gain (WB gain for environmental light). In addition, the environmental light gain acquisition unit 52 may obtain brightness distribution information from the brightness value of the flash non-emission image data and determine the AWB gain (WB gain for environmental light) on the basis of the brightness distribution information. Furthermore, the WB gain which is set for each of a plurality of environmental light types may be stored in a memory, such as the control memory 30, in advance and the environmental light gain acquisition unit 52 may analyze the flash non-emission image data to determine the type of environmental light, acquire the WB gain related to the determined type of environmental light from the memory, and set the WB gain as the WB gain for environmental light.

The flash light gain acquisition unit 54 acquires a white balance gain for flash light (hereinafter, referred to as a "WB gain for flash light") which is set in a case in which the light source type is flash light. For example, since it is possible to know the characteristics of flash light in advance, the WB gain for flash light which is calculated in advance according to the characteristics of flash light may be stored in a memory, such as the control memory 30, and the flash light gain acquisition unit 54 may directly or indirectly read the WB gain for flash light from the memory and acquire the WB gain for flash light.

The flash influence degree acquisition unit 56 acquires the degree of influence of flash indicating the ratio of flash light to environmental light in each pixel of the original image data. Specifically, the flash influence degree acquisition unit 56 acquires the brightness value (hereinafter, referred to as a "first brightness value") of each pixel of the flash non-emission image data as the first image data and acquires the brightness value (hereinafter, referred to as a "second brightness value") of each pixel of the flash emission image data as the second image data. Then, the flash influence degree acquisition unit 56 acquires degree of influence of flash on each pixel of the original image data from the first brightness value and the second brightness value.

A method for acquiring each of the first brightness value and the second brightness value and a method for acquiring the degree of influence of flash are not particularly limited. For example, in a case in which the flash emission image data (original image data) and the flash non-emission image data are RGB data, R data, G data, and B data are represented by "R_ij", "G_ij", and "B_ij" (where "i" indicates an X-axis value and "j" indicates a Y-axis value in a case in which a pixel position is represented by the X-axis value and the Y-axis value), respectively, for example, the first brightness value "Y1_ij" and the second brightness value "Y2_ij" (where "i" indicates an X-axis value and "j" indicates a Y-axis value in a case in which a pixel position is represented by the X-axis value and the Y-axis value) can be represented by the following Expressions 4 and 5.

$$Y1\_ij = R\_ij \times 0.299 + G\_ij \times 0.587 + B\_ij \times 0.114 \quad \text{[Expression 4]}$$

$$Y2\_ij = R\_ij \times 0.299 + G\_ij \times 0.587 + B\_ij \times 0.114 \quad \text{[Expression 5]}$$

In addition, a flash influence degree Ratio_ij (where "i" indicates an X-axis value and "j" indicates a Y-axis value in a case in which a pixel position is represented by the X-axis value and the Y-axis value) can be represented by, for example, the following Expression 6.

$$Ratio\_ij = 1 - (Y1\_ij / Y2\_ij) \quad \text{[Expression 6]}$$

The gain acquisition unit 40 acquires the WB gain WB_ij for each pixel of the original image data from the "WB gain WB 1 for environmental light" acquired by the environmental light gain acquisition unit 52 and the "WB gain WB2 for flash light" acquired by the flash light gain acquisition unit 54, on the basis of the "flash influence degree Ratio_ij" (see Expression 6) acquired by the flash influence degree acquisition unit 56. In a case in which the flash influence degree Ratio_ij indicates the influence rate of flash light in each pixel, the WB gain WB_ij for each pixel of the original image data can be acquired on the basis of, for example, the following Expression 7.

$$WB\_ij = WB1 \times (1 - Ratio\_ij) + WB2 \times Ratio\_ij \quad \text{[Expression 7]}$$

Figure 10:
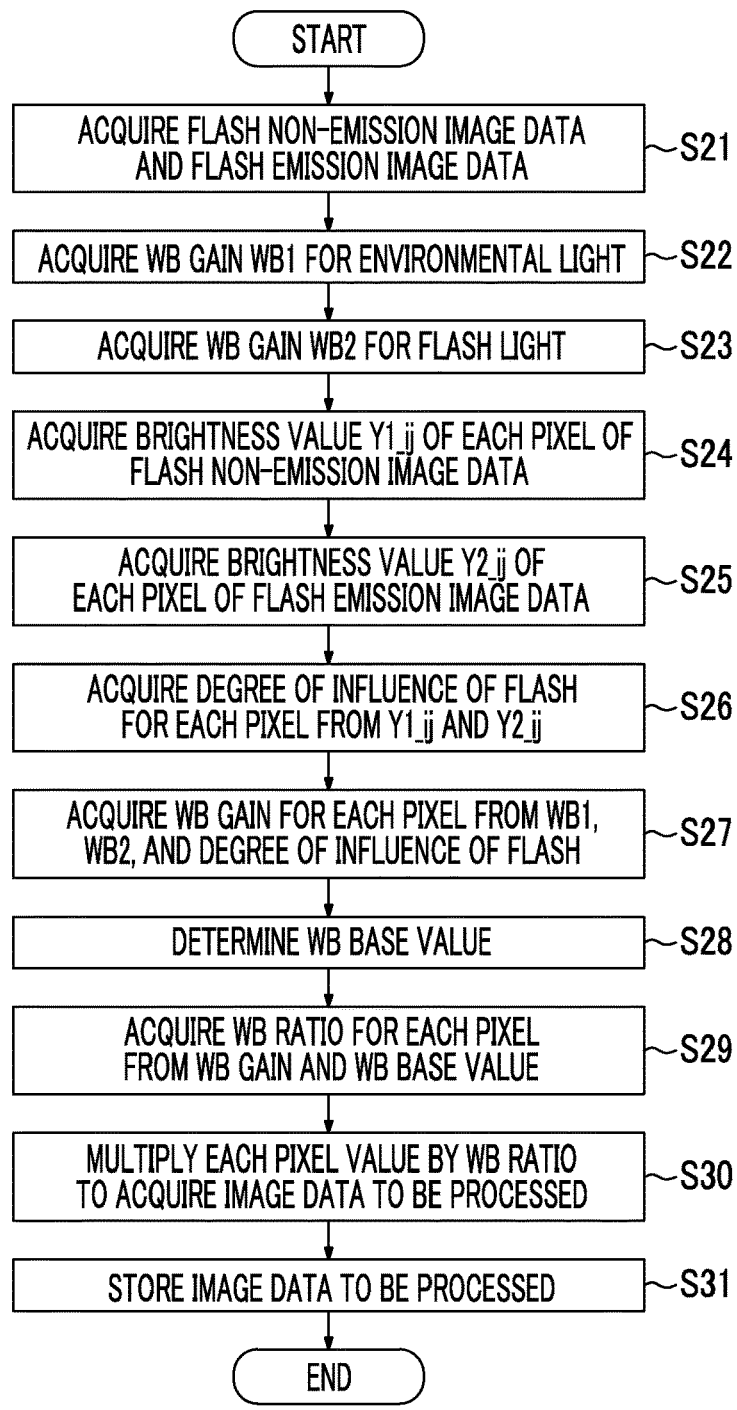
FIG. 10 is a flowchart illustrating the flow of image processing according to the fourth embodiment.

FIG. 10 is a flowchart illustrating the flow of image processing according to the fourth embodiment.

When the user presses the shutter button 6 to take a photograph, an image of an object is captured and the flash image acquisition unit 48 of the image processing unit 31 acquires the flash non-emission image data and the flash emission image data output from the imaging element 21 through the process processing unit 22, the A/D conversion unit 23, and the buffer memory 24 (S21 in FIG. 10).

Then, the environmental light gain acquisition unit 52 of the light source type data acquisition unit 50 acquires the WB gain WB1 for environmental light from the flash non-emission image data (S22) and the flash light gain acquisition unit 54 acquires a predetermined WB gain WB2 for flash light from a memory such as the control memory 30 (S23).

Then, the flash influence degree acquisition unit 56 acquires the brightness value (first brightness value Y1_ij) of each pixel of the flash non-emission image data (S24) and acquires the brightness value (second brightness value Y2_ij) of each pixel of the flash emission image data (S25). Then, the flash influence degree acquisition unit 56 acquires the flash influence degree Ratio_ij for each pixel from the first brightness value Y1_ij and the second brightness value Y2_ij (S26).

Then, the gain acquisition unit 40 acquires the WB gain WB_ij suitable for each pixel of the original image data (flash emission image data) from the WB gain WB1 for environmental light, the WB gain WB2 for flash light, and the flash influence degree Ratio_ij (S27).

Then, the ratio acquisition unit 42 determines the WB base value WBbase (S28) and acquires the WB ratio WBratio_ij for each pixel from the WB gain WB_ij suitable for each pixel of the original image data and the WB base value WBbase (S29).

Then, the processed image acquisition unit 44 multiplies each pixel value V_ij of the original image data (flash emission image data) by the WB ratio WBratio_ij to acquire processed image data (S30) and the storage control unit 33 stores the processed image data in the main memory 10 (S31).

Figure 11:
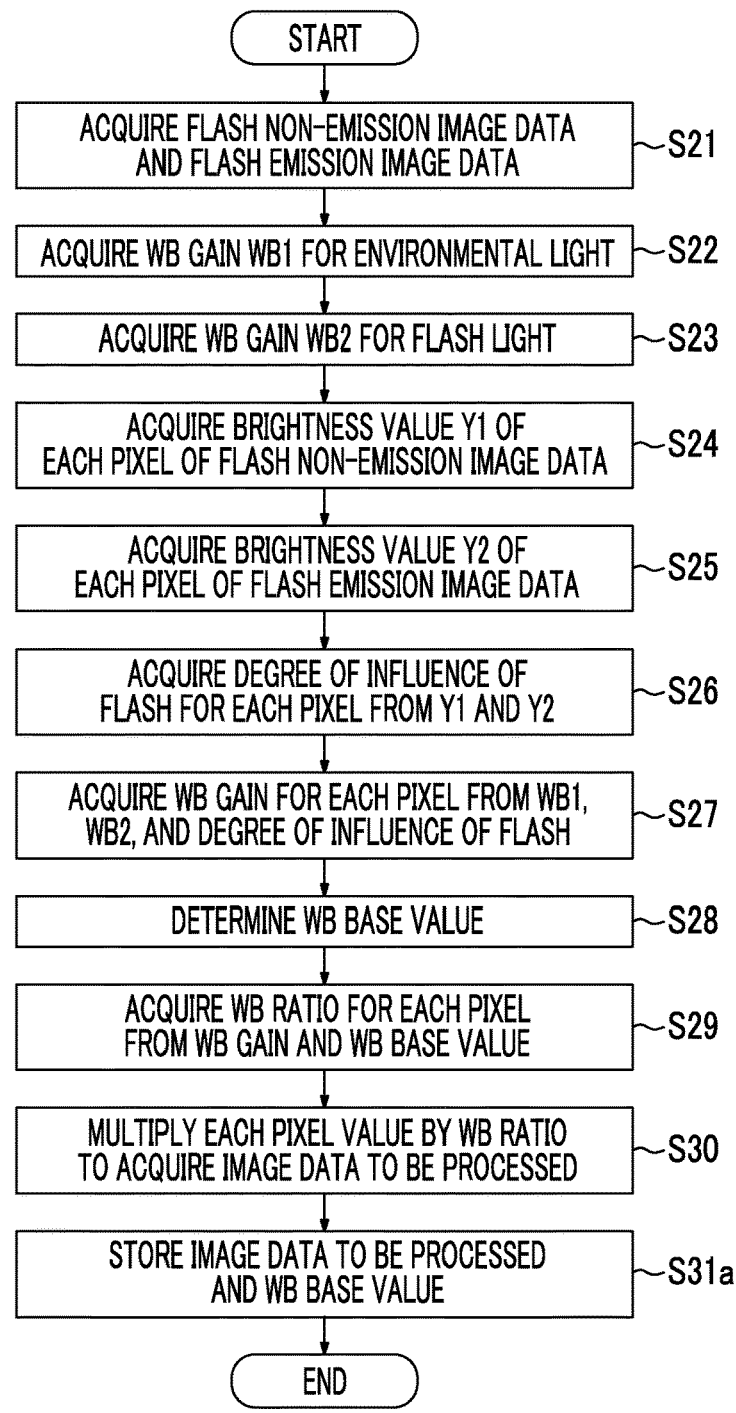
FIG. 11 is a flowchart illustrating a modification example of the flow of the image processing according to the fourth embodiment.

In the process flow illustrated in FIG. 10, similarly to the first embodiment, the processed image data is stored in the main memory 10 and the WB base value WBbase is not stored in the main memory 10. However, as illustrated in the flowchart of FIG. 11, after Steps S21 to S30, similarly to the second embodiment, the processed image data and the WB base value WBbase may be stored in the main memory 10, (S31*a* in FIG. 11).

Fifth Embodiment

In this embodiment, the detailed description of the same or similar structure and operation as those in the first to fourth embodiments will not be repeated.

This embodiment relates to a process which reads processed image data from the main memory 10 and applies the WB base value to the processed image data to obtain WB-processed image data (hereinafter, referred to as "white-balance-adjusted image data (WB-adjusted image data)") and relates to an example in which the WB base value is read from the main memory 10.

Therefore, for example, the main memory 10 according to this embodiment stores the processed image data and the WB base value used to generate the processed image data so as to be associated with each other, similarly to the processed image data stored in the main memory 10 in the second embodiment. In addition, an image processing unit 31 according to this embodiment reads the processed image data and the WB base value which are associated with each other and performs WB processing.

Figure 12:
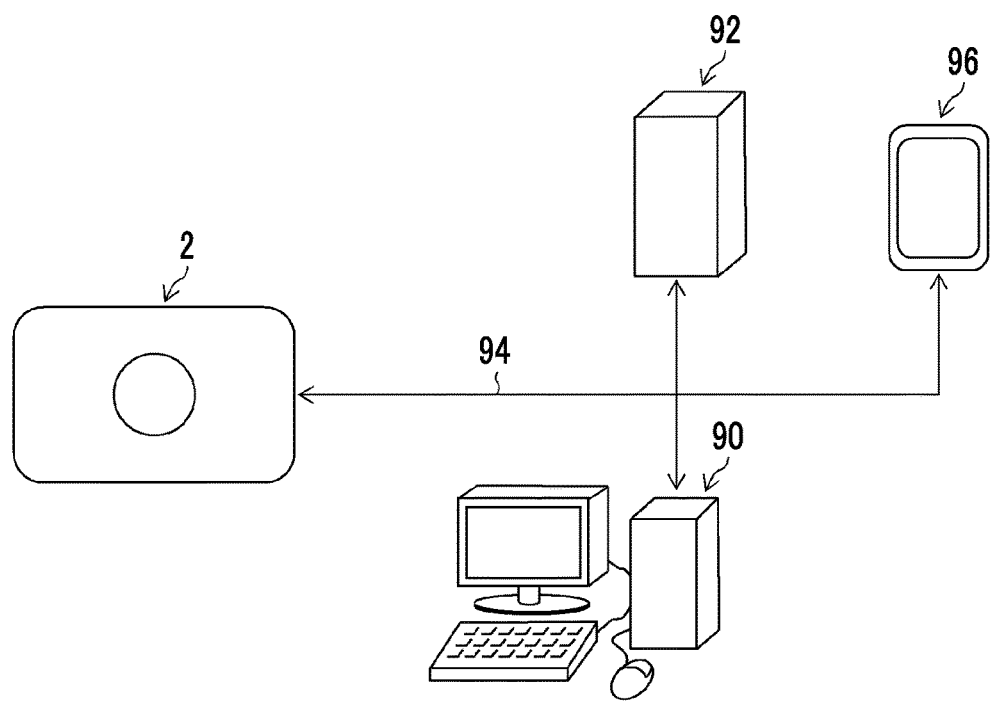
FIG. 12 is a conceptual diagram illustrating the connection among a digital camera, a computer, a server, and a portable terminal through a network.
Figure 13:
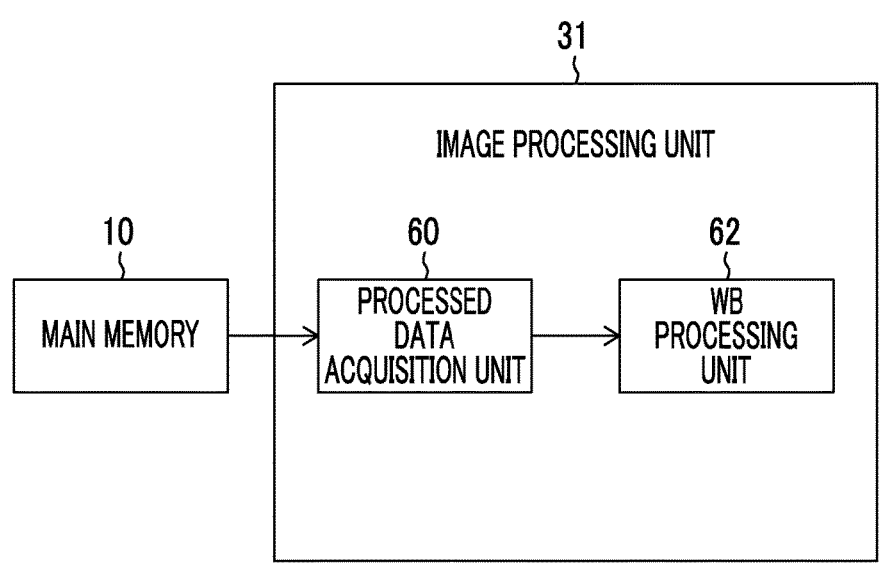
FIG. 13 is a block diagram illustrating an example of the functional structure of an image processing unit according to a fifth embodiment.

The image processing unit 31 illustrated in FIG. 13 may be provided integrally or separately from the "image processing unit 31 (see FIG. 4) including the gain acquisition unit 40, the ratio acquisition unit 42, and the processed image acquisition unit 44" described in the second embodiment. Therefore, for example, in a case in which the image processing unit 31 illustrated in FIG. 4 is provided in a digital camera 2, the image processing unit 31 illustrated in FIG. 13, which will be described below, may be similarly provided in the digital camera 2. Alternatively, the image processing unit 31 may be provided in a computer 90 or a server 92 that is connected to the digital camera 2 through a wired or wireless network 94, as illustrated in FIG. 12, or may be provided in, for example, the computer 90 that can be connected to the main memory 10 separated from the digital camera 2. In addition, the image processing unit 31 illustrated in FIG. 13, which will be described below, may be provided in a portable terminal 96 such as a smart phone or a tablet terminal which is connected to the digital camera 2, the computer 90, or the server 92 and can receive the processed image data.

FIG. 13 is a block diagram illustrating an example of the functional structure of the image processing unit 31 according to the fifth embodiment.

The image processing unit 31 according to this embodiment includes a processed data acquisition unit 60 and a WB processing unit 62.

The processed data acquisition unit 60 acquires the "processed image data acquired by multiplying each pixel value of the original image data by the WB ratio indicating the ratio of the WB gain to the WB base value" and the "WB base value" from the main memory (storage medium) 10.

The WB processing unit 62 multiplies each pixel value P_ij of the processed image data by the WB base value WBbase to acquire WB-adjusted image data (pixel value K_ij), as shown in Expression 3.

Figure 14:
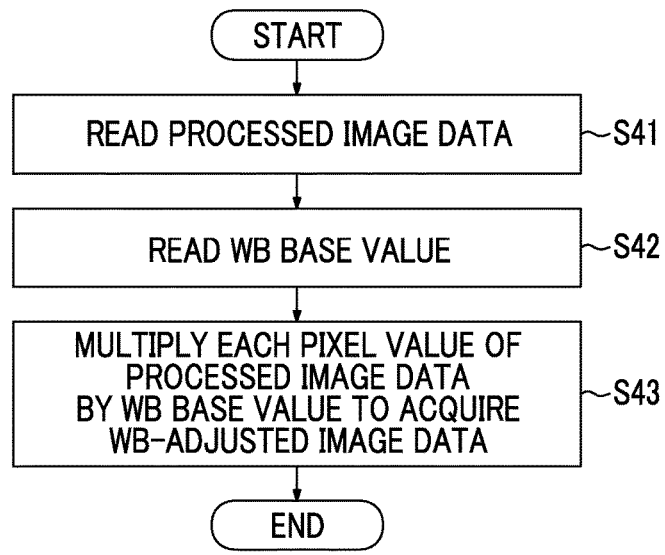
FIG. 14 is a flowchart illustrating the flow of image processing according to the fifth embodiment.

FIG. 14 is a flowchart illustrating the flow of image processing according to the fifth embodiment.

First, the processed data acquisition unit 60 reads the processed image data from the main memory 10 (S41 in FIG. 14) and reads the WB base value from the main memory 10 (S42).

Then, the WB processing unit 62 multiplies each pixel value of the processed image data by the WB base value to acquire the WB-adjusted image data (S43).

As described above, according to this embodiment, even in a case in which the processed image data is read and acquired from the main memory 10, it is possible to acquire the WB-adjusted image data subjected to multi-area WB processing. For example, the processed image data (RAW image data) in which the WB gain in the multi-area WB processing has been reflected and the WB base value are stored in the main memory 10. Therefore, in a case in which the processed image data (RAW image data) is developed, the user can simply acquire the WB-adjusted image data subjected to the multi-area WB processing. As such, according to this embodiment, it is possible to obtain image data subjected to appropriate multi-area WB processing subsequently.

Sixth Embodiment

In this embodiment, the detailed description of the same or similar structure and operation as those in the fifth embodiment will not be repeated.

This embodiment relates to a process which reads processed image data from the main memory 10 and applies the WB base value to the processed image data to obtain WB-adjusted image data and relates to an example in which the WB base value is estimated and used. Therefore, this embodiment is suitable for, for example, a case in which the WB base value used to generate the processed image data is not stored in the main memory 10, similarly to the processed image data stored in the main memory 10 in the first embodiment.

Figure 15:
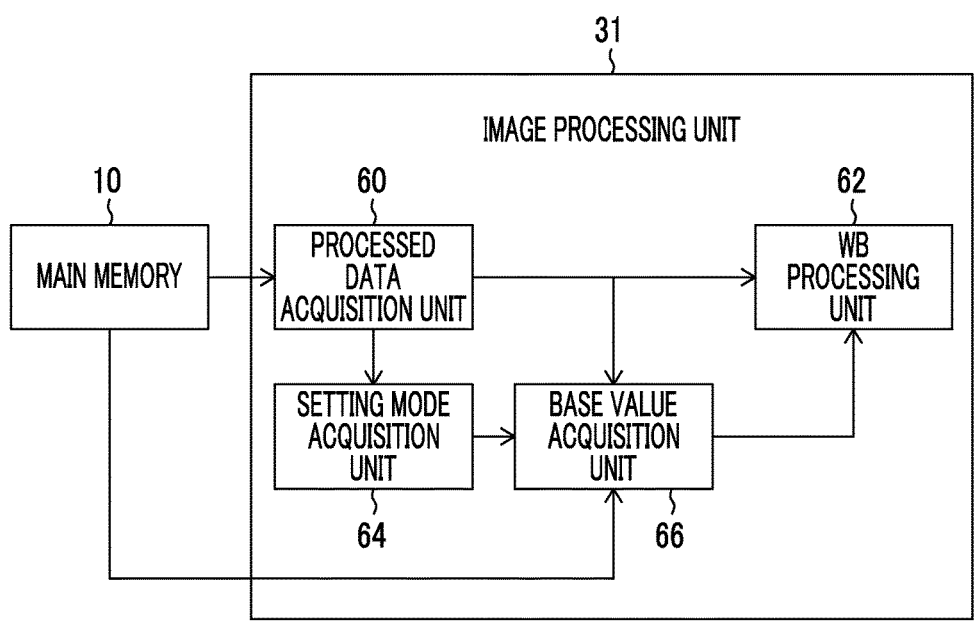
FIG. 15 is a block diagram illustrating an example of the functional structure of an image processing unit according to a sixth embodiment.

FIG. 15 is a block diagram illustrating an example of the functional structure of an image processing unit 31 according to the sixth embodiment.

The image processing unit 31 according to this embodiment includes a setting mode acquisition unit 64 and a base value acquisition unit 66 in addition to the processed data acquisition unit 60 and the WB processing unit 62.

The processed data acquisition unit 60 according to this embodiment acquires the processed image data from the main memory (storage medium) 10, but does not acquire the WB base value.

The setting mode acquisition unit 64 acquires information about a white balance setting mode (hereinafter, referred to as a "WB setting mode") when the original image data is acquired. A method for acquiring the information about the WB setting mode is not particularly limited. For example, in a case in which the information about the WB setting mode is included in the tag information of the processed image data, the setting mode acquisition unit 64 may acquire the information about the WB setting mode from the tag information added to the processed image data acquired by the processed data acquisition unit 60 or may directly acquire the information about the WB setting mode from the main memory 10. In a case in which the information about the WB setting mode when the original image data is acquired is not stored in the main memory 10 with respect to the processed image data, the setting mode acquisition unit 64 may assume, for example, an arbitrary WB setting mode (for example, an auto white balance mode (hereinafter, referred to as an "AWB mode")) as the WB setting mode.

The WB setting mode is not particularly limited. For example, the WB setting mode may be any one of a preset white balance mode (hereinafter, referred to as a "preset WB mode") in which the WB gain is preset according to a predetermined light source type (for example, daylight (sunlight), a fluorescent light, or a light bulb), an AWB mode in which the WB gain applied to the original image data is determined on the basis of the color distribution information of the original image data, and a custom white balance mode (hereinafter, referred to as a "custom WB mode") in which the WB gain applied to the original image data is determined on the basis of the color distribution information of reference image data different from the original image data. In addition, a manual white balance mode (hereinafter, referred to as a "manual WB mode") in which the user manually determines an individual WB gain may be selected as the WB setting mode.

The base value acquisition unit 66 estimates the WB base value on the basis of the "the information about the WB setting mode when the original image data is acquired" which is acquired by the setting mode acquisition unit 64. For example, in a case in which the WB setting mode when the original image data is acquired is the AWB mode, the base value acquisition unit 66 acquires the AWB gain from the color distribution of the processed image data acquired by the processed data acquisition unit 60 and estimates the WB base value on the basis of the AWB gain. In a case in which the WB setting mode when the original image data is acquired is a mode in which the WB gain is predetermined, such as the preset WB mode or the custom WB mode, the base value acquisition unit 66 acquires the WB gain for the WB setting mode which is stored so as to be associated with the processed image data and estimates the WB base value on the basis of the acquired WB gain. A method for acquiring "the WB gain for the WB setting mode which is stored so as to be associated with the processed image data" is not particularly limited. For example, "the WB gain for the WB setting mode which is stored so as to be associated with the processed image data" may be acquired from the tag information of the processed image data acquired by the processed data acquisition unit 60, the internal parameters of RAW development software, or the information stored in the server 92.

The WB processing unit 62 multiplies each pixel value of the processed image data by the WB base value estimated by the base value acquisition unit 66 to acquire the WB-adjusted image data (see Expression 3).

Figure 16:
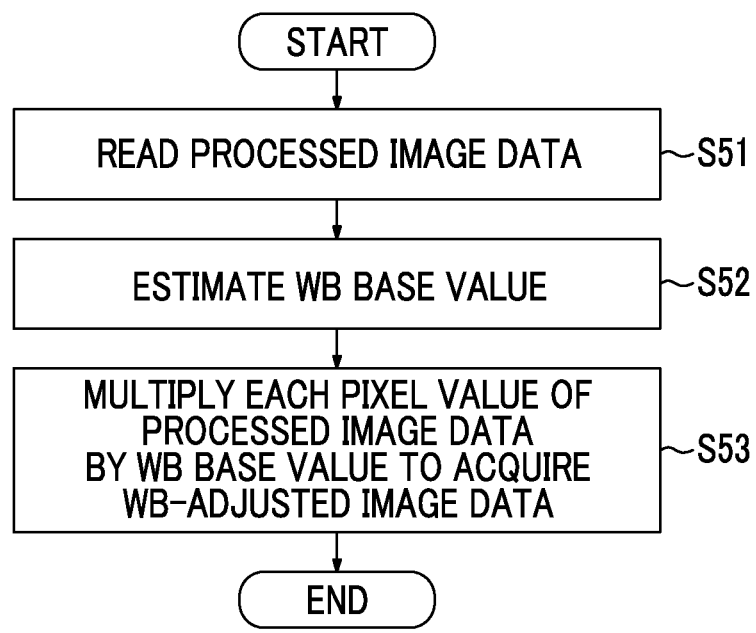
FIG. 16 is a flowchart illustrating the flow of image processing according to the sixth embodiment.

FIG. 16 is a flowchart illustrating the flow of image processing according to the sixth embodiment.

First, the processed data acquisition unit 60 reads the processed image data from the main memory 10 and acquires the processed image data (S51 in FIG. 16) and the setting mode acquisition unit 64 acquires the information about the WB setting mode when the original image data is acquired.

Then, the base value acquisition unit 66 estimates the WB base value on the basis of the information about the WB setting mode when the original image data is acquired (S52).

Then, the WB processing unit 62 multiplies each pixel value of the processed image data by the estimated WB base value to acquire the WB-adjusted image data (S53).

As described above, according to this embodiment, even in a case in which the processed image data can be acquired from the main memory 10 and the WB base value cannot be acquired from the main memory 10, it is possible to acquire the WB-adjusted image data subjected to multi-area WB processing.

Seventh Embodiment

In this embodiment, the detailed description of the same or similar structure and operation as those in the fifth and sixth embodiments will not be repeated.

This embodiment relates to a process which reads processed image data from the main memory 10 and applies the WB base value to the processed image data to obtain WB-adjusted image data. In this embodiment, a desired white balance processing mode (hereinafter, referred to as a "WB processing mode") is selected by the user and not the WB base value but the WB gain corresponding to the WB processing mode selected by the user is applied to the processed image data.

Figure 17:
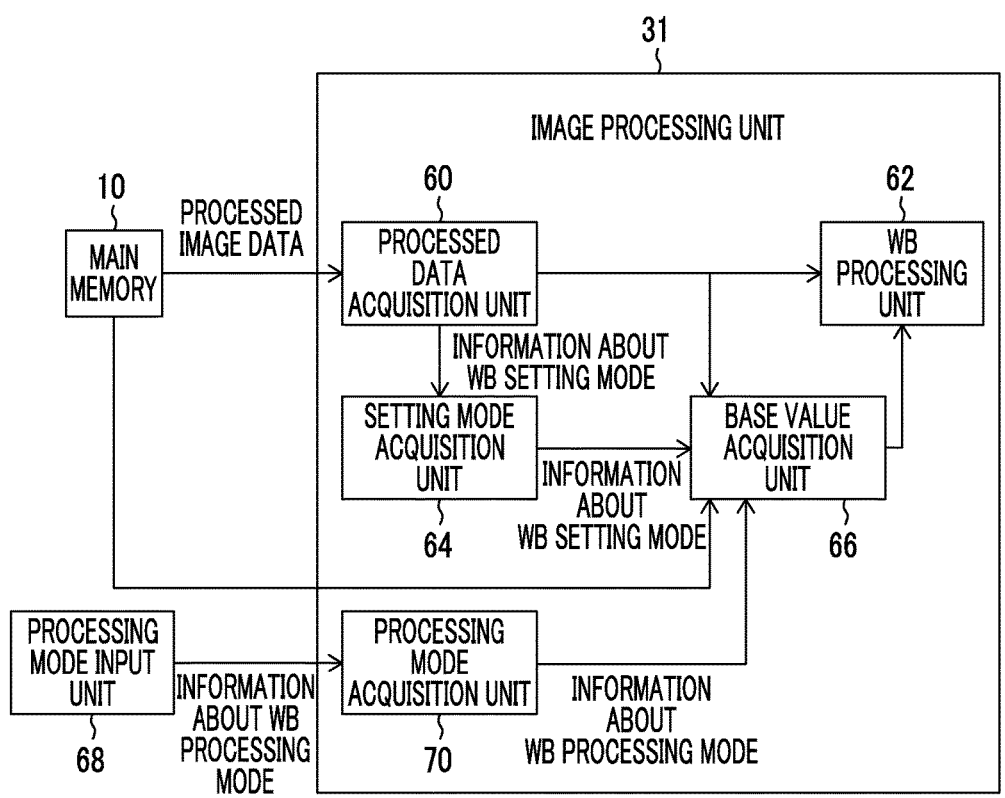
FIG. 17 is a block diagram illustrating an example of the functional structure of an image processing unit according to a seventh embodiment.

FIG. 17 is a block diagram illustrating an example of the functional structure of an image processing unit 31 according to the seventh embodiment.

The image processing unit 31 according to this embodiment includes a processing mode acquisition unit 70 in addition to the processed data acquisition unit 60, the WB processing unit 62, the setting mode acquisition unit 64, and the base value acquisition unit 66.

The processing mode acquisition unit 70 acquires information about the WB processing mode applied to the processed image data from a processing mode input unit 68. The term "WB processing mode" is a WB mode that is desired by the user. The user inputs the WB mode that is desired as the actual WB processing for the processed image data as the "WB processing mode" to the processing mode input unit 68.

The detailed form of the processing mode input unit 68 is not particularly limited. In a case in which the processing mode input unit 68 is provided in the digital camera 2, for example, the "operating unit 9 (see FIG. 2)" may form the processing mode input unit 68. In addition, in a case in which the processing mode input unit 68 is provided in the computer 90, the server 92, or the portable terminal 96, the processing mode input unit 68 can be formed by an arbitrary operating unit, such as a keyboard, a mouse, or a touch panel which is provided in or connected to these types of devices.

The "information about the WB processing mode applied to the processed image data" acquired by the processing mode acquisition unit 70 is transmitted to the base value acquisition unit 66. In addition, information about the "WB setting mode of the original image data" acquired by the setting mode acquisition unit 64 is transmitted to the base value acquisition unit 66.

The base value acquisition unit 66 acquires the WB base value on the basis of the information about the white balance setting mode and the information about the WB processing mode. That is, in a case in which the WB processing mode is determined to be the same as the WB setting mode, the base value acquisition unit 66 acquires the WB base value on the basis of the WB setting mode. In a case in which the WB processing mode is determined to be different from the WB setting mode, the base value acquisition unit 66 acquires the WB gain on the basis of the WB processing mode. In this case, for example, the base value acquisition unit 66 may acquire the WB gain and/or the WB base value from the tag information of the processed image data stored in the main memory 10 or may analyze the processed image data acquired by the processed data acquisition unit 60 to acquire the WB gain (for example, the AWB gain).

The WB processing unit 62 multiplies each pixel of the processed image data which has been acquired from the main memory 10 by the processed data acquisition unit 60 by the WB base value or the WB gain acquired by the base value acquisition unit 66 to acquire the WB-adjusted image data.

Figure 18:
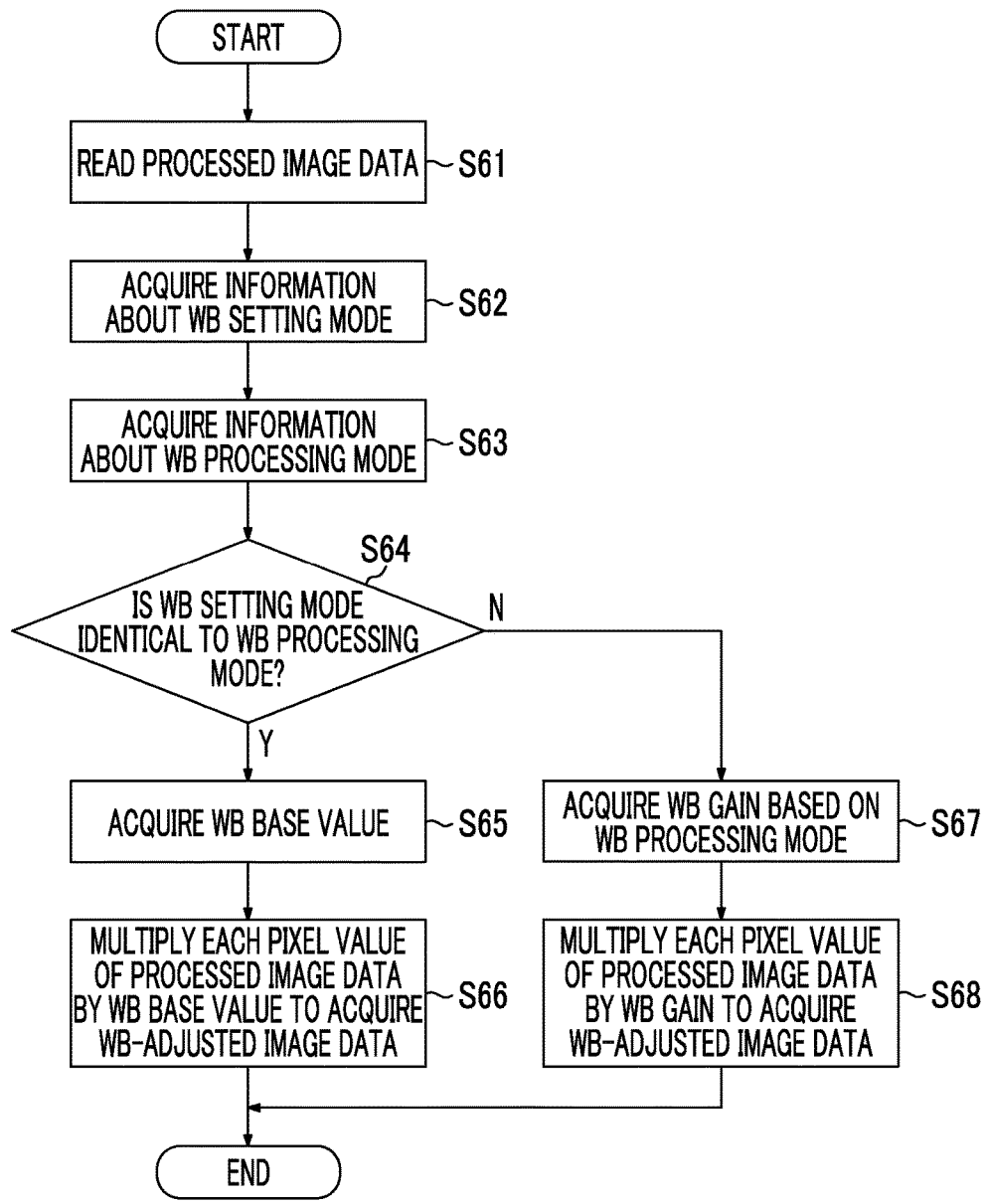
FIG. 18 is a flowchart illustrating the flow of image processing according to the seventh embodiment.

FIG. 18 is a flowchart illustrating the flow of image processing according to the seventh embodiment. Hereinafter, an example in which the WB base value used to generate the processed image data is stored as the tag information of the processed image data in the main memory 10 will be described.

First, the processed data acquisition unit 60 reads the processed image data from the main memory 10 and acquires the processed image data (S61 in FIG. 18). The setting mode acquisition unit 64 acquires information about the WB setting mode when the original image data is acquired from the main memory 10 (S62). The processing mode acquisition unit 70 acquires information about the WB processing mode applied to the processed image data (S63).

Then, the base value acquisition unit 66 determines whether the WB setting mode and the WB processing mode are the same WB mode (S64).

In a case in which the WB setting mode and the WB processing mode are determined to be the same WB mode (Y in S64), the base value acquisition unit 66 acquires the WB base value from, for example, the tag information of the processed image data acquired by the processed data acquisition unit 60 (S65). Then, the WB processing unit 62 multiplies each pixel value of the processed image data by the WB base value to acquire the WB-adjusted image data (S66).

On the other hand, in a case in which the WB setting mode and the WB processing mode are determined to be different (N in S64), the base value acquisition unit 66 acquires the WB gain corresponding to the WB processing mode (S67). Then, the WB processing unit 62 multiplies each pixel value of the processed image data by the WB gain to acquire the WB-adjusted image data (S68).

As described above, according to this embodiment, in a case in which the user wants WB processing in a mode different from the WB setting mode when the original image data is acquired, it is possible to acquire the WB-adjusted image data subjected to WB processing which corresponds to the WB processing mode desired by the user. In this case, for example, it is possible to change the color balance of the entire image so as to meet the user's demand while obtaining the effect of multi-area WB processing.

In a case in which it is predetermined that the WB base value is determined on the basis of the AWB mode, the WB-adjusted image data may be acquired on the basis of whether the WB processing mode applied to the processed image data is the AWB mode.

Figure 19:
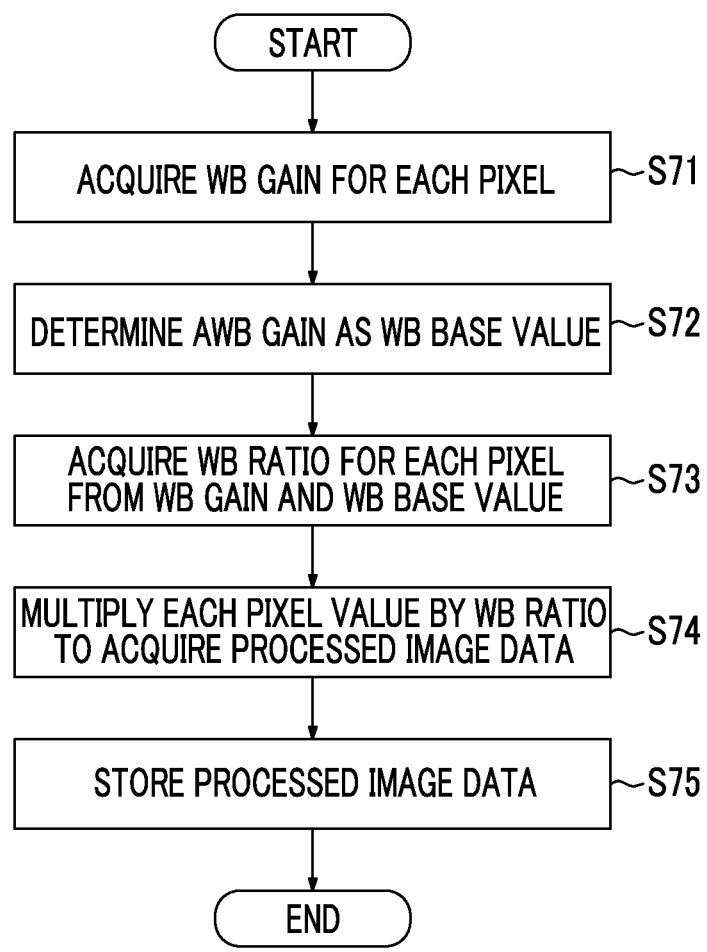
FIG. 19 is a diagram illustrating a modification example of the flow of the image processing of the image processing unit (see FIG. 4) according to the first embodiment.

FIG. 19 is a diagram illustrating a modification example of the image processing flow of the image processing unit 31 (see FIG. 4) according to the first embodiment. In this modification example, it is predetermined that the AWB gain is used as the WB base value used to generate the processed image data. That is, the gain acquisition unit 40 illustrated in FIG. 4 acquires the WB gain for each pixel of the original image data (S71 in FIG. 19) and the ratio acquisition unit 42 analyzes the original image data to acquire the AWB gain and sets the AWB gain as the WB base value (S72). Then, similarly to the first embodiment (see S13 to S15 in FIG. 5), the WB ratio of the WB gain to the WB base value is acquired for each pixel (S73). The value of each pixel is multiplied by the WB ratio to acquire processed image data (S74) and the processed image data is stored in the main memory 10 (S75).

Figure 20:
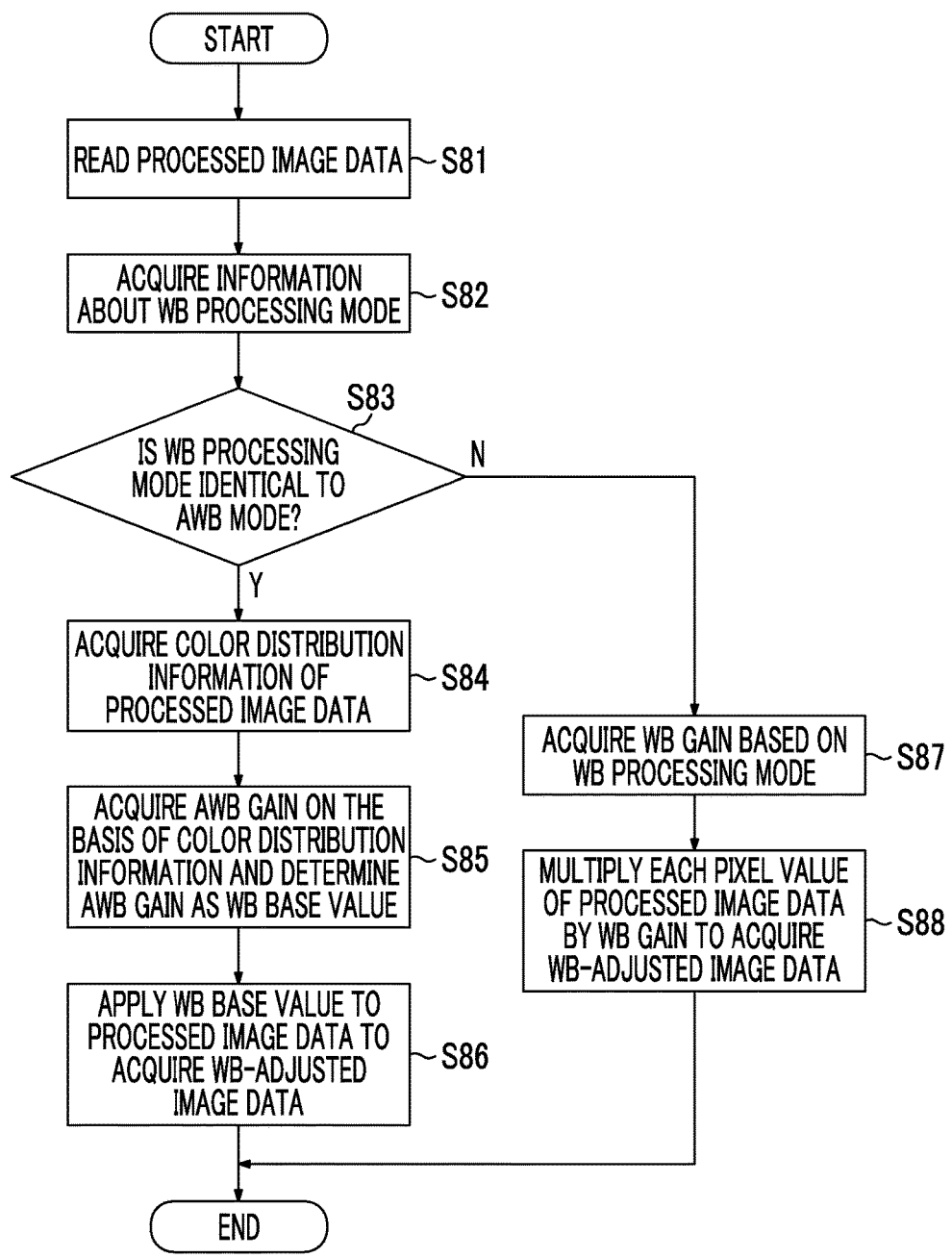
FIG. 20 is a diagram illustrating a modification example of the flow of the image processing of the image processing unit (see FIG. 17) according to the seventh embodiment.

FIG. 20 is a diagram illustrating a modification example of the image processing flow of the image processing unit 31 (see FIG. 17) according to the seventh embodiment. The image processing unit 31 having the functional structure illustrated in FIG. 17 can perform multi-area WB processing for the processed image data which is stored in the main memory 10 by the image processing flow illustrated in FIG. 19 according to the image processing flow illustrated in FIG. 20. That is, similarly to the seventh embodiment (see S61 and S63 in FIG. 18), the processed image data is read from the main memory 10 (S81 in FIG. 20) and information about the WB processing mode is acquired from the processing mode input unit 68 (S82). Then, the base value acquisition unit 66 (see FIG. 17) determines whether the WB processing mode is the AWB mode (S83).

In a case in which the WB processing mode is determined to be the AWB mode (Y in S83), the base value acquisition unit 66 analyzes the processed image data to acquire the color distribution information of the processed image data (S84), acquires the AWB gain from the color distribution information, and determines the AWB gain as the WB base value (S85). Then, the WB processing unit 62 multiplies each pixel value of the processed image data by the WB base value to acquire WB-adjusted image data (S86).

On the other hand, in a case in which the WB processing mode is determined not to be the AWB mode (N in S83), the base value acquisition unit 66 acquires the WB gain based on the WB processing mode, similarly to the seventh embodiment (see S67 in FIG. 18) (S87), and the WB processing unit 62 multiplies each pixel value of the processed image data by the WB gain to acquire WB-adjusted image data (S88).

In the modification example illustrated in FIG. 19, the WB base value used to generate the processed image data may be stored in the main memory 10 so as to be associated with the processed image data (see S75 in FIG. 19). In this case, the base value acquisition unit 66 may read the WB base value stored in the main memory 10, instead of acquiring the AWB gain from the color distribution information of the processed image data (see S84 to S85 in FIG. 20), and the WB processing unit 62 may apply the WB base value read by the base value acquisition unit 66 to the processed image data to acquire WB-adjusted image data.

<Other Modification Examples>

Among the above-described embodiments and modification examples, any embodiments and modification examples may be combined with each other. The above-described embodiments are illustrative and the invention may be applied to other structures.

For example, only in a case in which the WB setting mode when the original image data is acquired is the AWB mode, the processed image data may be stored in the main memory 10 as in the first to fourth embodiments. In a case in which the WB setting mode when the original image data is acquired is the modes other than the AWB mode, the storage control unit 33 may store the image data to which the WB setting mode has been applied in the main memory 10 as usual, or may store the WB gain for each pixel corresponding to the WB setting mode or the WB gain common to all of the pixels in the main memory 10 so as to be associated with the image data.

The processed image data may be stored in the main memory 10 as in the first to fourth embodiments, regardless of the WB setting mode when the original image data is acquired. In this case, the user can perform multi-area WB processing for the processed image data read from the main memory 10 subsequently even in a case in which the multi-area WB processing is not scheduled to be performed in the future when the original image data is acquired. In this case, according to the first to fourth embodiments, the WB gain for each pixel is not stored separately from the image data and the processed image data in which a multi-area WB gain is reflected is stored. Therefore, a large waste of storage capacity is prevented.

That is, as described above, a special process or information is required to perform the multi-area WB processing. In a case in which the user wants to perform the multi-area WB processing when the original image data is acquired, it is possible to perform a special process for the multi-area WB processing or to acquire special information when the original image data is acquired. However, in a case in which the user wants to perform the multi-area WB processing in a stage in which, for example, RAW image data is developed after imaging, a special process for the multi-area WB processing which is required during imaging is not performed and information for the multi-area WB processing which needs to be acquired during imaging is not acquired. As a result, it is difficult to achieve the multi-area WB processing. For example, in a case in which the multi-area WB processing is performed for image data, which has been captured while flash light is emitted in a night portrait scene, as the original image data, it is necessary to also acquire flash non-emission image data, to acquire the degree of influence of flash for each pixel from the difference between the pixel values of the flash emission image data and the flash non-emission image data, and to acquire the mixture ratio (WB ratio) of the WB gain (WB gain for environmental light) suitable for the background (night scene) and the WB gain (WB gain for flash light) suitable for flash light for each pixel according to the degree of influence of flash. However, even if these processes are performed in the stage in which RAW image data (original image data) is developed, it is difficult to acquire the "WB gain for each pixel" for performing multi-area WB processing since only the flash emission image data is stored as the RAW image data and the flash non-emission image data required for multi-area WB processing is absent. Therefore, according to this modification example in which the processed image data is stored in the main memory 10 as in the first to fourth embodiments, regardless of the WB setting mode when the original image data is acquired, even if the user wants to perform multi-area WB processing subsequently, it is possible to acquire WB-adjusted image data subjected to appropriate multi-area WB processing.

Each of the above-mentioned functional structures can be implemented by any hardware, software, or a combination thereof. For example, the invention can also be applied to a program that causes a computer to perform an image processing method (image processing procedure) in each of the above-mentioned devices and processing units (for example, the image processing unit 31), a computer-readable storage medium (non-transitory storage medium) that stores the program, or a computer in which the program can be installed.

The aspects to which the invention can be applied are not limited to the digital camera and the computer (server). The invention can also be applied to cameras having an imaging function as a main function and mobile devices having functions (a calling function, a communication function, and other computer functions) other than the imaging function in addition to the imaging function. Other aspects to which the invention can be applied are, for example, mobile phones, smart phones, personal digital assistants (PDAs), and portable game machines with a camera function. Hereinafter, an example of the smart phone to which the invention can be applied will be described.

<Structure of Smart Phone>

Figure 21:
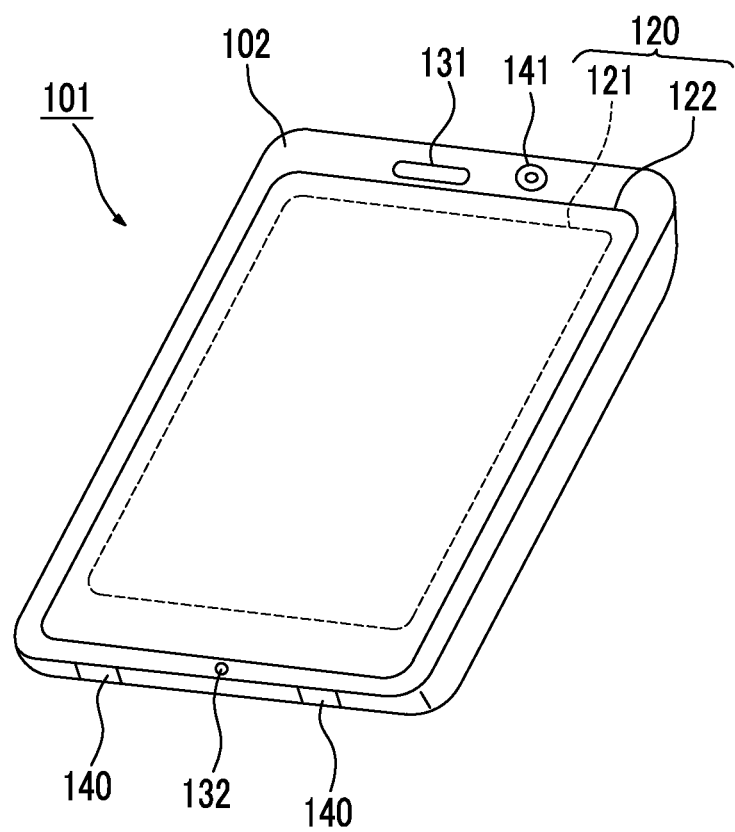
FIG. 21 is a diagram illustrating the outward appearance of a smart phone.

FIG. 21 is a diagram illustrating the outward appearance of a smart phone 101. The smart phone 101 illustrated in FIG. 21 comprises a housing 102 with a flat panel shape and a display input unit 120 having a display panel 121 as a display unit and an operation panel 122 as an input unit which are integrally formed on one surface of the housing 102. The housing 102 comprises a speaker 131, a microphone 132, an operating unit 140, and a camera unit 141. However, the configuration of the housing 102 is not limited thereto. For example, the display unit and the input unit may be independently provided, or the housing 102 may have a folding structure or a sliding structure.

Figure 22:
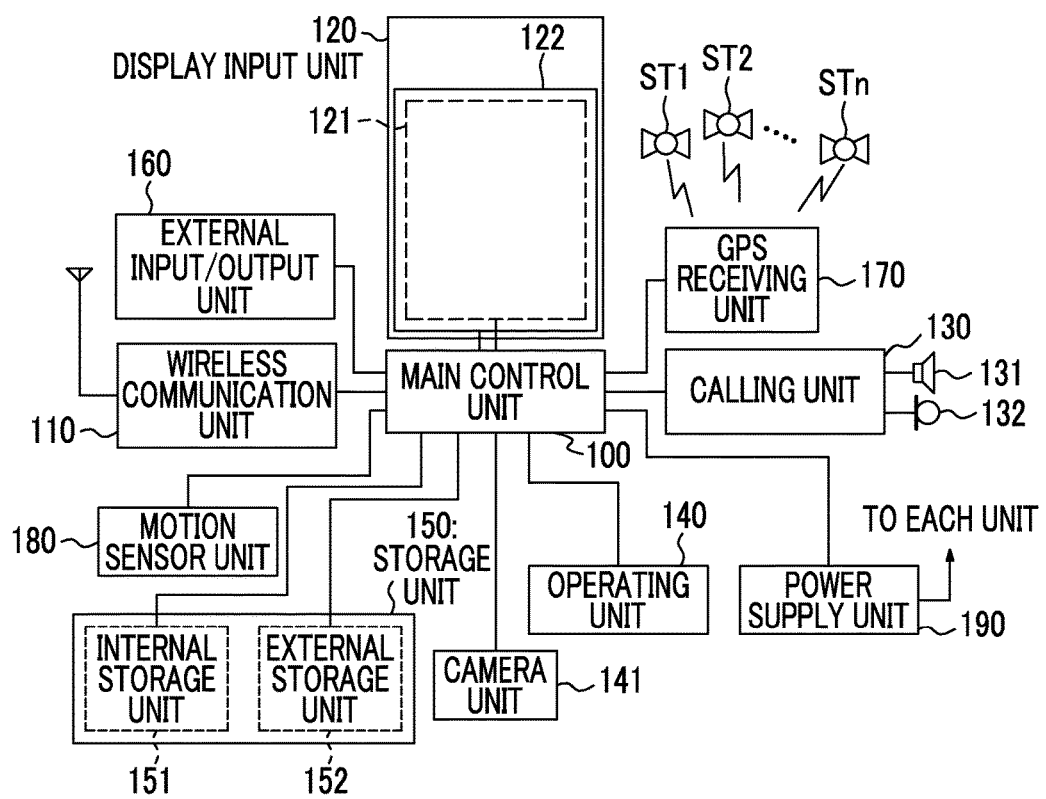
FIG. 22 is a block diagram illustrating the structure of the smart phone illustrated in FIG. 21.

FIG. 22 is a block diagram illustrating an example of the structure of the smart phone 101 illustrated in FIG. 21. As illustrated in FIG. 22, the smart phone 101 comprises, as main components, a wireless communication unit 110, the display input unit 120, a calling unit 130, the operating unit 140, the camera unit 141, a storage unit 150, an external input/output unit 160, a global positioning system (GPS) receiving unit 170, a motion sensor unit 180, a power supply unit 190, and a main control unit 100. The smart phone 101 has, as a main function, a wireless communication function which performs mobile wireless communication through a base station apparatus and a mobile communication network.

The wireless communication unit 110 performs wireless communication with the base station apparatus which is accommodated in the mobile communication network in response to an instruction from the main control unit 100. The wireless communication is used to transmit and receive various types of file data, such as voice data and image data, and electronic mail data or to receive, for example, web data and streaming data.

The display input unit 120 is a so-called touch panel that displays, for example, images (still images and moving images) or text information to visually transmit information to the user and detects the user's operation for the displayed information under the control of the main control unit 100 and comprises the display panel 121 and the operation panel 122.

The display panel 121 uses, for example, a liquid crystal display (LCD) or an organic electro-luminescence display (OELD) as a display device. The operation panel 122 is a device that is provided such that an image displayed on a display surface of the display panel 121 is visually recognized and detects coordinates operated by a finger of the user or a stylus. When the device is operated by a finger of the user or a stylus, a detection signal which is generated by the operation is output to the main control unit 100. Then, the main control unit 100 detects an operation position (coordinates) on the display panel 121 on the basis of the received detection signal.

As illustrated in FIG. 21, the display panel 121 and the operation panel 122 of the smart phone 101 which is an embodiment of the imaging device according to the invention are integrated to form the display input unit 120 and the operation panel 122 is arranged so as to completely cover the display panel 121. In a case in which this arrangement is used, the operation panel 122 may have a function of detecting the user's operation even in a region other than the display panel 121. In other words, the operation panel 122 may comprise a detection region (hereinafter, referred to as a display region) for an overlap portion which overlaps the display panel 121 and a detection region (hereinafter, referred to as a non-display region) for an outer edge portion which does not overlap the display panel 121.

The size of the display region may be exactly equal to the size of the display panel 121. However, the sizes are not necessarily equal to each other. The operation panel 122 may comprise two sensitive regions, that is, an outer edge portion and an inner portion other than the outer edge portion. The width of the outer edge portion is appropriately designed according to, for example, the size of the housing 102. Examples of a position detecting method which is used in the operation panel 122 include a matrix switching method, a resistive film method, a surface elastic wave method, an infrared method, an electromagnetic induction method, and a capacitive sensing method. Any of the methods may be used.

The calling unit 130 comprises the speaker 131 and the microphone 132. The calling unit 130 converts the voice of the user which is input through the microphone 132 into voice data which can be processed by the main control unit 100 and outputs the converted voice data to the main control unit 100. In addition, the calling unit 130 decodes voice data received by the wireless communication unit 110 or the external input/output unit 160 and outputs the decoded voice data from the speaker 131. As illustrated in FIG. 21, for example, the speaker 131 can be mounted on the same surface as the display input unit 120 and the microphone 132 can be mounted on a side surface of the housing 102.

The operating unit 140 is a hardware key which uses, for example, a key switch and receives instructions from the user. For example, as illustrated in FIG. 21, the operating unit 140 is a push button switch which is mounted on the side surface of the housing 102 of the smart phone 101, is turned on when it is pressed by, for example, a finger, and is turned off by the restoring force of a spring when the finger is taken off.

The storage unit 150 stores a control program or control data of the main control unit 100, application software, address data which is associated with, for example, the names or phone numbers of communication partners, transmitted and received electronic mail data, web data which is downloaded by web browsing, and downloaded content data. In addition, the storage unit 150 temporarily stores, for example, streaming data. The storage unit 150 includes an internal storage unit 151 which is provided in the smart phone and an external storage unit 152 which has a detachable external memory slot. The internal storage unit 151 and the external storage unit 152 forming the storage unit 150 are implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 160 functions as an interface with all of the external apparatuses connected to the smart phone 101 and is directly or indirectly connected to other external apparatuses by communication (for example, universal serial bus (USB) communication or IEEE1394 defined by the Institute of Electrical and Electronics Engineers, Inc. (IEEE)) or a network (for example, the Internet, a wireless local area network (LAN), a Bluetooth (registered trademark) network, a radio frequency identification (RFID) network, an infrared data association (IrDA) (registered trademark) network, an ultra wideband (UWB) (registered trademark) network, or a ZigBee (registered trademark) network).

Examples of the external apparatus connected to the smart phone 101 include a wired/wireless headset, a wired/wireless external charger, a wired/wireless data port, a memory card or a subscriber identity module (SIM) card/user identity module (UIM) card which is connected through a card socket, an external audio/video apparatus which is connected through audio/video input/output (I/O) terminals, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit may transmit data which is received from the external apparatus to each component of the smart phone 101 or may transmit data in the smart phone 101 to the external apparatus.

The GPS receiving unit 170 receives GPS signals transmitted from GPS satellites ST1 to STn and performs a position measurement process on the basis of the received GPS signals to detect a position including the latitude, longitude, and height of the smart phone 101, in response to an instruction from the main control unit 100. In a case in which the GPS receiving unit 170 can acquire positional information from the wireless communication unit 110 or the external input/output unit 160 (for example, the wireless LAN), the GPS receiving unit 170 can detect the position using the positional information.

The motion sensor unit 180 comprises, for example, a triaxial acceleration sensor and detects the physical movement of the smart phone 101 in response to an instruction from the main control unit 100. When the physical movement of the smart phone 101 is detected, the moving direction or acceleration of the smart phone 101 is detected. The detection result is output to the main control unit 100.

The power supply unit 190 supplies power which is stored in a battery (not illustrated) to each unit of the smart phone 101 in response to an instruction from the main control unit 100.

The main control unit 100 comprises a microprocessor, operates on the basis of the control program or control data stored in the storage unit 150, and controls the overall operation of each unit of the smart phone 101. The main control unit 100 has an application processing function and a mobile communication control function of controlling each unit of a communication system in order to perform voice communication or data communication through the wireless communication unit 110.

The application processing function is implemented by the operation of the main control unit 100 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The main control unit 100 has, for example, an image processing function which displays an image on the display input unit 120 on the basis of image data (still image or moving image data) such as received data or downloaded streaming data. The image processing function means the function of the main control unit 100 decoding the image data, performing image processing on the decoding result, and displaying the image on the display input unit 120.

The main control unit 100 performs display control for the display panel 121 and operation detection control for detecting the operation of the user through the operating unit 140 and the operation panel 122.

The main control unit 100 performs the display control to display a software key, such as an icon for starting application software or a scroll bar, or to display a window for writing electronic mail. The scroll bar means a software key for receiving an instruction to move a displayed portion of an image that is too large to fit into the display region of the display panel 121.

The main control unit 100 performs the operation detection control to detect the operation of the user input through the operating unit 140, to receive an operation for the icon or the input of a character string to an input field of the window through the operation panel 122, or to receive a request to scroll the displayed image through the scroll bar.

In addition, the main control unit 100 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 100 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which captures an image using an imaging element such as a CMOS. In addition, the camera unit 141 can convert captured image data into image data which is compressed in, for example, a JPEG format, stores the converted image data in the storage unit 150, and outputs the converted image data through the external input/output unit 160 or the wireless communication unit 110, under the control of the main control unit 100. As illustrated in FIG. 21, the camera unit 141 is mounted on the same surface as the display input unit 120 in the smart phone 101. However, the mounting position of the camera unit 141 is not limited thereto. For example, the camera unit 141 may be mounted on the rear surface of the display input unit 120 or a plurality of camera units 141 may be mounted. In a case in which a plurality of camera units 141 are mounted, the camera units 141 which are used to capture images may be switched such that a single camera unit captures images or the plurality of camera units 141 may be simultaneously used to capture images.

The camera unit 141 can be used for various functions of the smart phone 101. For example, the image captured by the camera unit 141 can be displayed on the display panel 121 or the image captured by the camera unit 141 can be used as one of the operation inputs of the operation panel 122. When the GPS receiving unit 170 detects the position, the position may be detected with reference to the image from the camera unit 141. In addition, the optical axis direction of the camera unit 141 in the smart phone 101 may be determined or the current usage environment may be determined, with reference to the image from the camera unit 141, using the triaxial acceleration sensor or without using the triaxial acceleration sensor. Of course, the image from the camera unit 141 may be used in the application software.

For example, the positional information which is acquired by the GPS receiving unit 170, the voice information which is acquired by the microphone 132 (for example, the main control unit may convert the voice information into text information), and the posture information which is acquired by the motion sensor unit 180 may be added to the image data of a still image or a moving image and the image data may be stored in the storage unit 150 and may be output through the external input/output unit 160 or the wireless communication unit 110.

The image processing unit 31 (see FIGS. 4, 7 to 9, 13, 15, and 17) may be implemented by, for example, the main control unit 100.

EXPLANATION OF REFERENCES

2: digital camera
3: camera body
4: lens barrel
5: flash light emitting unit
6: shutter button
7: power switch
8: display unit
9: operating unit
10: main memory
12: lens unit
20: mechanical shutter
21: imaging element
22: process processing unit
23: A/D conversion unit
24: buffer memory
25: system control unit
26: shutter driving unit
27: lens driving unit
28: power supply control unit
29: power supply
30: control memory
31: image processing unit
32: compression and decompression unit
33: storage control unit
34: clock device
35: display control unit
36: user interface
40: gain acquisition unit
42: ratio acquisition unit
44: processed image acquisition unit
46: light source type determination unit
48: flash image acquisition unit
50: light source type data acquisition unit
52: environmental light gain acquisition unit
54: flash light gain acquisition unit
56: flash influence degree acquisition unit
60: processed data acquisition unit
62: WB processing unit
64: setting mode acquisition unit
66: base value acquisition unit
68: processing mode input unit
70: processing mode acquisition unit
90: computer
92: server
94: network
96: portable terminal
100: main control unit
101: smart phone
102: housing
110: wireless communication unit
120: display input unit
121: display panel
122: operation panel
130: calling unit
131: speaker
132: microphone
140: operating unit
141: camera unit
150: storage unit
151: internal storage unit
152: external storage unit
160: external input/output unit
170: GPS receiving unit
180: motion sensor unit
190: power supply unit

What is claimed is:

1. An image processing device comprising:
 a processor configured to:
  acquire a white balance gain for each pixel of original image data;
  determine a white balance base value and acquires a white balance ratio indicating a ratio of the white balance gain to the white balance base value for each pixel of the original image data;
  multiply each pixel value of the original image data by the white balance ratio to acquire processed image data,
  determine a light source type of the original image data, wherein the processor acquires the white balance gain for each pixel of the original image data on the basis of the light source type of the original image data determined by the processor;
acquire first image data indicating an influence of a first light source type and second image data indicating an influence of a second light source type,
wherein, in a case in which the light source types of the original image data determined by the processor include the first light source type and the second light source type, the processor acquires the white balance gain for each pixel of the original image data on the basis of the first image data and the second image data;
acquire flash emission image data which is captured while flash light is emitted and flash non-emission image data which is captured when flash light is not emitted,
wherein the processor acquires the first image data on the basis of the flash non-emission image data, using the first light source type as environmental light, and acquires the second image data on the basis of the flash emission image data, using the second light source type as flash light,
acquire a white balance gain for environmental light which is set in a case in which the light source type of the original image data determined by the processor is environmental light;
acquire a white balance gain for flash light which is set in a case in which the light source type is flash light; and
acquire a first brightness value of each pixel of the flash non-emission image data as the first image data, acquires a second brightness value of each pixel of the flash emission image data as the second image data, and acquires a degree of influence of flash for each pixel from the first brightness value and the second brightness value,
wherein the processor acquires the white balance gain for each pixel of the original image data from the white balance gain for environmental light and the white balance gain for flash light on the basis of the degree of influence of flash.

2. The image processing device according to claim 1, wherein the processor determines the white balance base value on the basis of one light source type which is included in the light source types of the original image data determined by the processor.

3. The image processing device according to claim 2, wherein the processor determines the white balance base value on the basis of the environmental light of the original image data determined by the processor.

4. The image processing device according to claim 1, wherein the processor stores the processed image data and the white balance base value in a storage medium.

5. An image processing device comprising:
a processor configured to:
acquire processed image data, which is acquired by multiplying each pixel value of original image data by a white balance ratio indicating a ratio of a white balance gain to a white balance base value, and the white balance base value from a storage medium;
multiply each pixel value of the processed image data by the white balance base value to acquire white-balance-adjusted image data;
determine a light source type of the original image data, wherein the processor acquires the white balance gain for each pixel of the original image data on the basis of the light source type of the original image data determined by the processor;
acquire first image data indicating an influence of a first light source type and second image data indicating an influence of a second light source type,
wherein, in a case in which the light source types of the original image data determined by the processor include the first light source type and the second light source type, the processor acquires the white balance gain for each pixel of the original image data on the basis of the first image data and the second image data;
acquire flash emission image data which is captured while flash light is emitted and flash non-emission image data which is captured when flash light is not emitted,
wherein the processor acquires the first image data on the basis of the flash non-emission image data, using the first light source type as environmental light, and acquires the second image data on the basis of the flash emission image data, using the second light source type as flash light,
acquire a white balance gain for environmental light which is set in a case in which the light source type of the original image data determined by the processor is environmental light;
acquire a white balance gain for flash light which is set in a case in which the light source type is flash light; and
acquire a first brightness value of each pixel of the flash non-emission image data as the first image data, acquires a second brightness value of each pixel of the flash emission image data as the second image data, and acquires a degree of influence of flash for each pixel from the first brightness value and the second brightness value,
wherein the processor acquires the white balance gain for each pixel of the original image data from the white balance gain for environmental light and the white balance gain for flash light on the basis of the degree of influence of flash.

6. An image processing device comprising:
a processor configured to:
acquire processed image data, which is acquired by multiplying each pixel value of original image data by a white balance ratio indicating a ratio of a white balance gain to a white balance base value that is determined on the basis of a white balance setting mode when the original image data is acquired, from a storage medium;
acquire information about the white balance setting mode when the original image data is acquired;
estimate the white balance base value on the basis of the information about the white balance setting mode when the original image data is acquired; and
multiply each pixel value of the processed image data by the white balance base value estimated by the processor to acquire white-balance-adjusted image data,
wherein the white balance setting mode is any one of a preset white balance mode in which the white balance gain is preset, an auto white balance mode in which the white balance gain applied to the original image data is determined on the basis of color distribution information of the original image data, and a custom white balance mode in which the white balance gain applied to the original image data is determined on the basis of color distribution information of reference image data which is different from the original image data.

7. An image processing device comprising:
a processor configured to:
acquire processed image data, which is acquired by multiplying each pixel value of original image data by a white balance ratio indicating a ratio of a white balance gain to a white balance base value that is determined on the basis of a white balance setting mode when the original image data is acquired, from a storage medium;
acquire information about the white balance setting mode when the original image data is acquired;
acquire information about a white balance processing mode applied to the processed image data;
acquire the white balance base value on the basis of the white balance setting mode in a case in which the white balance processing mode is determined to be the same as the white balance setting mode on the basis of the information about the white balance setting mode and the information about the white balance processing mode and acquires the white balance base value on the basis of the white balance processing mode in a case in which the white balance processing mode is determined to be different from the white balance setting mode; and
multiply each pixel of the processed image data by the white balance base value acquired by the processor to acquire white-balance-adjusted image data.

8. The image processing device according to claim 1, wherein the processed image data is RAW image data.

9. The image processing device according to claim 1, wherein the processed image data is uncompressed image data.

10. The image processing device according to claim 1, wherein the processed image data is reversibly compressed image data.

11. The image processing device according to claim 1, wherein the processed image data is irreversibly compressed image data.

12. An image processing method comprising:
acquiring a white balance gain for each pixel of original image data;
determining a white balance base value and acquiring a white balance ratio indicating a ratio of the white balance gain to the white balance base value for each pixel of the original image data;
multiplying each pixel value of the original image data by the white balance ratio to acquire processed image data;
determine a light source type of the original image data,
wherein the processor acquires the white balance gain for each pixel of the original image data on the basis of the light source type of the original image data determined by the processor;
acquire first image data indicating an influence of a first light source type and second image data indicating an influence of a second light source type,
wherein, in a case in which the light source types of the original image data determined by the processor include the first light source type and the second light source type, the processor acquires the white balance gain for each pixel of the original image data on the basis of the first image data and the second image data;
acquire flash emission image data which is captured while flash light is emitted and flash non-emission image data which is captured when flash light is not emitted,
wherein the processor acquires the first image data on the basis of the flash non-emission image data, using the first light source type as environmental light, and acquires the second image data on the basis of the flash emission image data, using the second light source type as flash light,
acquire a white balance gain for environmental light which is set in a case in which the light source type of the original image data determined by the processor is environmental light;
acquire a white balance gain for flash light which is set in a case in which the light source type is flash light; and
acquire a first brightness value of each pixel of the flash non-emission image data as the first image data, acquires a second brightness value of each pixel of the flash emission image data as the second image data, and acquires a degree of influence of flash for each pixel from the first brightness value and the second brightness value,
wherein the processor acquires the white balance gain for each pixel of the original image data from the white balance gain for environmental light and the white balance gain for flash light on the basis of the degree of influence of flash.

13. An image processing method comprising:
acquiring processed image data, which is acquired by multiplying each pixel value of original image data by a white balance ratio indicating a ratio of a white balance gain to a white balance base value, and the white balance base value from a storage medium;
multiplying each pixel value of the processed image data by the white balance base value to acquire white-balance-adjusted image data;
determine a light source type of the original image data,
wherein the processor acquires the white balance gain for each pixel of the original image data on the basis of the light source type of the original image data determined by the processor;
acquire first image data indicating an influence of a first light source type and second image data indicating an influence of a second light source type,
wherein, in a case in which the light source types of the original image data determined by the processor include the first light source type and the second light source type, the processor acquires the white balance gain for each pixel of the original image data on the basis of the first image data and the second image data;
acquire flash emission image data which is captured while flash light is emitted and flash non-emission image data which is captured when flash light is not emitted,
wherein the processor acquires the first image data on the basis of the flash non-emission image data, using the first light source type as environmental light, and acquires the second image data on the basis of the flash emission image data, using the second light source type as flash light,
acquire a white balance gain for environmental light which is set in a case in which the light source type of the original image data determined by the processor is environmental light;
acquire a white balance gain for flash light which is set in a case in which the light source type is flash light; and
acquire a first brightness value of each pixel of the flash non-emission image data as the first image data, acquires a second brightness value of each pixel of the flash emission image data as the second image data, and acquires a degree of influence of flash for each pixel from the first brightness value and the second brightness value,
wherein the processor acquires the white balance gain for each pixel of the original image data from the white balance gain for environmental light and the white balance gain for flash light on the basis of the degree of influence of flash.

14. An image processing method comprising:
acquiring processed image data, which is acquired by multiplying each pixel value of original image data by a white balance ratio indicating a ratio of a white balance gain to a white balance base value that is determined on the basis of a white balance setting mode when the original image data is acquired, from a storage medium;
acquiring information about the white balance setting mode when the original image data is acquired;
estimating the white balance base value on the basis of the information about the white balance setting mode when the original image data is acquired; and
multiplying each pixel value of the processed image data by the estimated white balance base value to acquire white-balance-adjusted image data,
wherein the white balance setting mode is any one of a preset white balance mode in which the white balance gain is preset, an auto white balance mode in which the white balance gain applied to the original image data is determined on the basis of color distribution information of the original image data, and a custom white balance mode in which the white balance gain applied to the original image data is determined on the basis of color distribution information of reference image data which is different from the original image data.

15. An image processing method comprising:
acquiring processed image data, which is acquired by multiplying each pixel value of original image data by a white balance ratio indicating a ratio of a white balance gain to a white balance base value that is determined on the basis of a white balance setting mode when the original image data is acquired, from a storage medium;
acquiring information about the white balance setting mode when the original image data is acquired;
acquiring information about a white balance processing mode applied to the processed image data;
acquiring the white balance base value on the basis of the white balance setting mode in a case in which the white balance processing mode is determined to be the same as the white balance setting mode on the basis of the information about the white balance setting mode and the information about the white balance processing mode, and acquiring the white balance base value on the basis of the white balance processing mode in a case in which the white balance processing mode is determined to be different from the white balance setting mode; and
multiplying each pixel of the processed image data by the acquired white balance base value to acquire white-balance-adjusted image data.

* * * * *